US008787622B2

(12) United States Patent
Watanabe

(10) Patent No.: US 8,787,622 B2
(45) Date of Patent: Jul. 22, 2014

(54) BIOMETRIC AUTHENTICATION DEVICE, BIOMETRIC AUTHENTICATION METHOD, AND RECORDING MEDIUM

(75) Inventor: Masaki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 12/618,102

(22) Filed: Nov. 13, 2009

(65) Prior Publication Data

US 2010/0127827 A1 May 27, 2010

(30) Foreign Application Priority Data

Nov. 27, 2008 (JP) ................................ 2008-303258

(51) Int. Cl.
*G06K 9/00* (2006.01)
(52) U.S. Cl.
USPC ........................................................ 382/115
(58) Field of Classification Search
None
See application file for complete search history.

(56) References Cited

U.S. PATENT DOCUMENTS

| 3,689,135 | A | * | 9/1972 | Young et al. ................... 351/210 |
| 7,668,350 | B2 | * | 2/2010 | Rowe ............................. 382/124 |
| 2003/0072475 | A1 | | 4/2003 | Tamori | |
| 2008/0002860 | A1 | * | 1/2008 | Super et al. .................... 382/114 |

FOREIGN PATENT DOCUMENTS

| JP | 2000-222361 | 8/2000 |
| JP | 2002-150296 | 5/2002 |
| JP | 2003-111749 | 4/2003 |
| JP | 2003-178306 | 6/2003 |
| JP | 2007-524441 | 8/2007 |
| WO | 2004/090786 | 10/2004 |

OTHER PUBLICATIONS

Yachida Masahiko, "Robot Vision", Shokodo Co. Ltd., 1990, pp. 91-94.
Japanese Office Action issued Jun. 12, 2012 in corresponding Japanese Patent Application No. 2008-303258.

* cited by examiner

*Primary Examiner* — Chan Park
*Assistant Examiner* — Elisa Rice
(74) *Attorney, Agent, or Firm* — Staas & Halsey LLP

(57) ABSTRACT

A biometric authentication device and method include extracting movement information representing bending and stretching of an imaging object from a plurality of images obtained, and determining whether or not the imaging object is a biological object, based on the movement information.

15 Claims, 37 Drawing Sheets

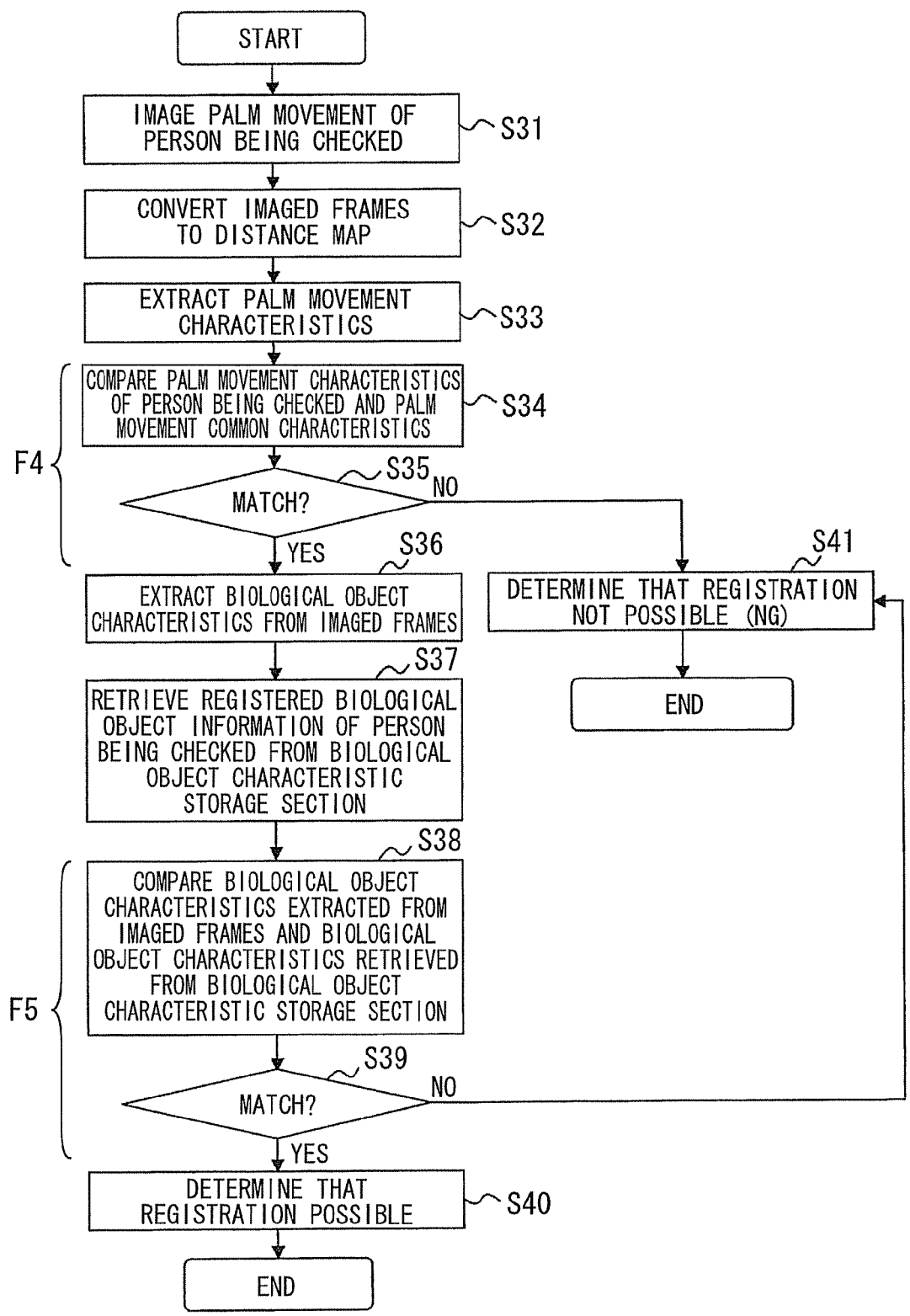

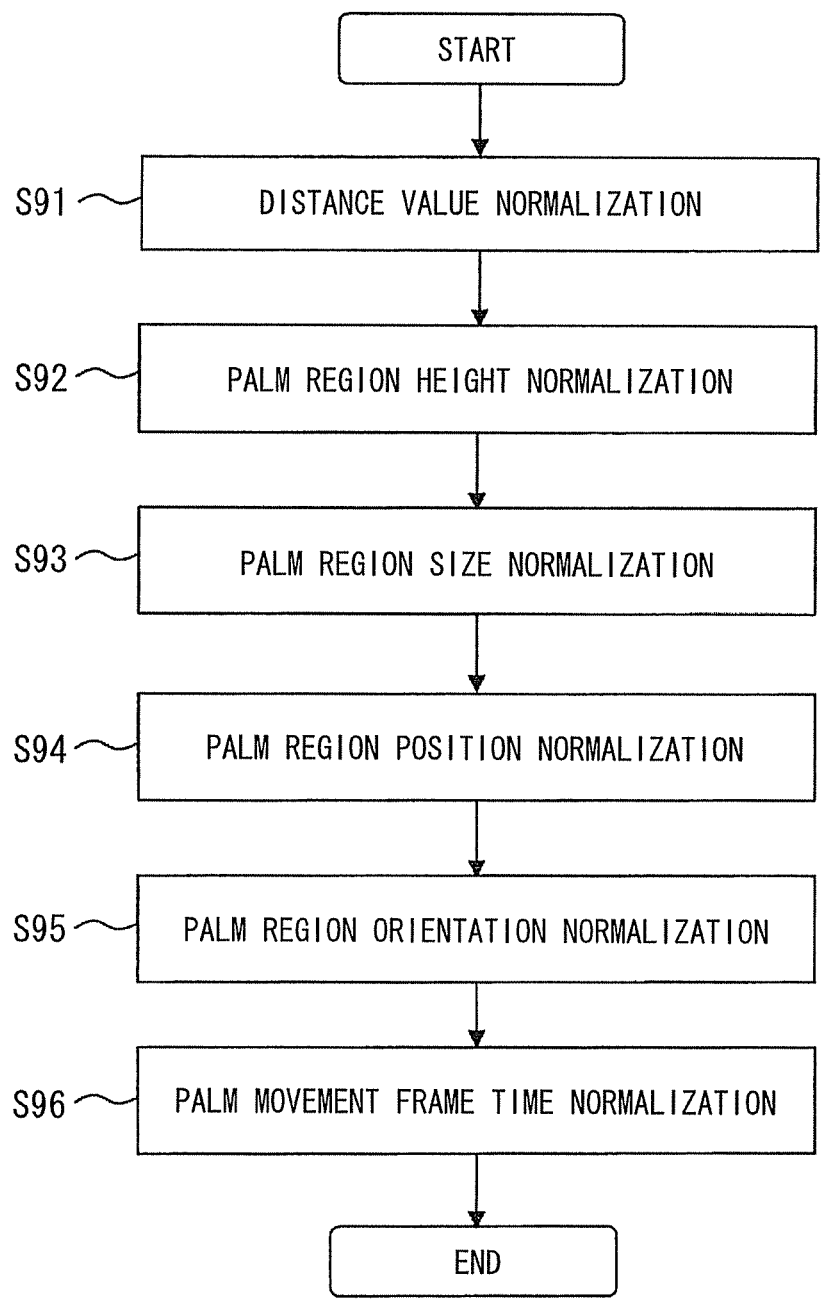

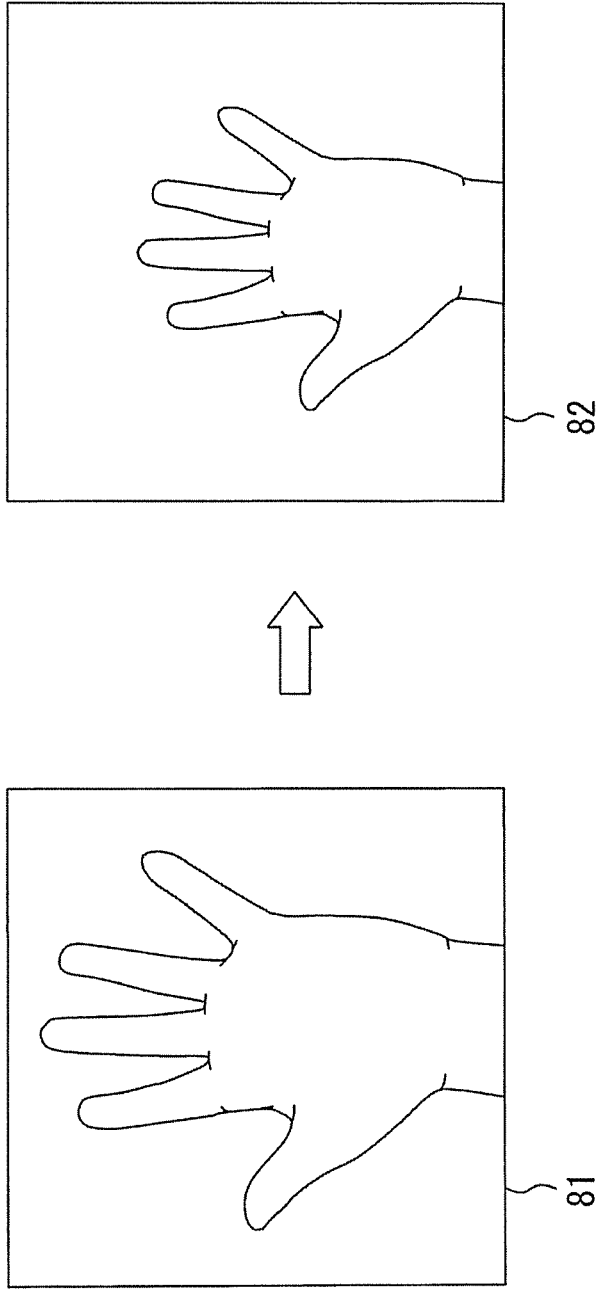

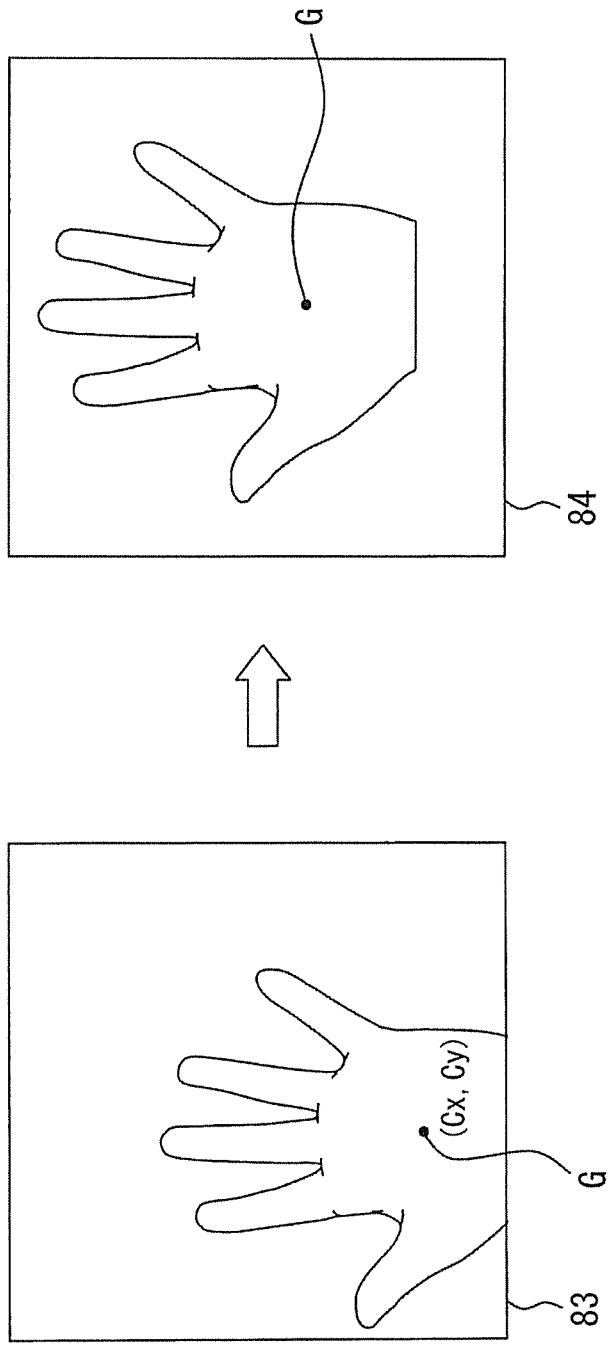

(PALM MOVEMENT COMMON CHARACTERISTICS)

821 (ZEROTH FRAME)     82n (ELEVENTH FRAME)

(MOVEMENT CHARACTERISTICS OF PERSON BEING CHECKED)

831 (ZEROTH FRAME)     83n (ELEVENTH FRAME)

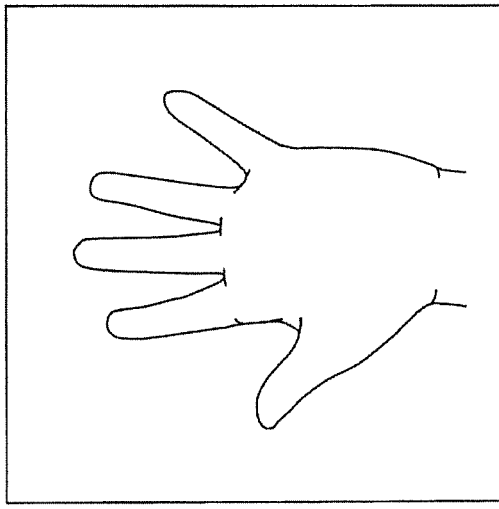
FIG. 30B $d_{nk}(i, j)$ CHARACTERISTICS OF PERSON BEING CHECKED
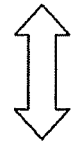
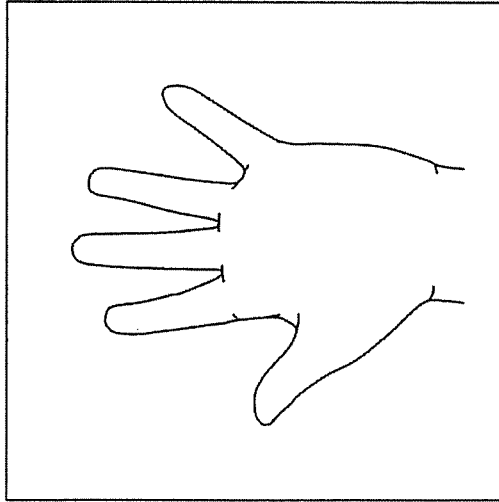
FIG. 30A $d_{mk}(i, j)$ COMMON CHARACTERISTICS

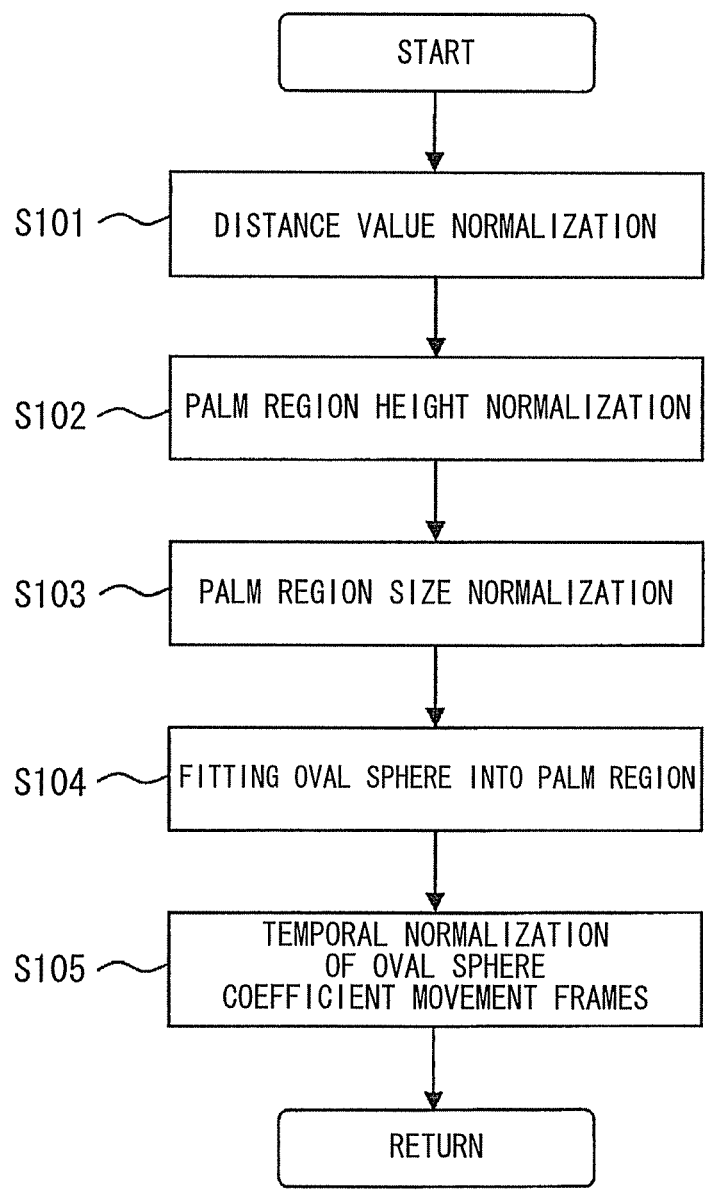

BIOMETRIC AUTHENTICATION DEVICE, BIOMETRIC AUTHENTICATION METHOD, AND RECORDING MEDIUM

CROSS-REFERENCE TO RELATED APPLICATIONS

This application is based upon and claims the benefit of priority from the prior Japanese Patent Application No. 2008-303258 filed on Nov. 27, 2008, the entire contents of which are incorporated herein by reference.

BACKGROUND

1. Field

Embodiments described herein relate to a biometric determination using images acquired from a biological object, such as a palm, etc.

2. Description of the Related Art

For example, there is a biometric authentication which uses a vascular pattern of a palm. This authentication utilizes the fact that reduced hemoglobin in blood vessels absorbs near-infrared light. This reduced hemoglobin is included in veins near the surface of the palm. Reflected light of near-infrared light illuminated onto the palm is imaged. From an image obtained by this means, it is possible to extract a vein pattern of the palm as a black line portion. By using this vein pattern, it is possible to identify a biological object, and it is possible to check an individual who is a biological object.

In relation to a biometric determination performed as a preliminary to this kind of authentication, Japanese Laid-open Patent Publication No. 2003-111749 discusses one which measures electrical output characteristics of a body and, by comparing them with electrical output characteristics of a human body, determines whether or not the body is a human body.

Also, Japanese Patent Application Publication No. 2007-524441 discusses a biometric determination which analyzes scattered light of light illuminated onto a body using a multi-spectrum, and confirms whether or not a frequency configuration of the scattered light is the same as one emitted from a human body.

Also, Japanese Laid-open Patent Publication No. 2002-150296 discusses a dynamic biometric authentication which two-dimensionally treats and matches a matching of people's movements, and images.

SUMMARY

According to an embodiment, a biometric authentication device includes an imaging section, and a determination section which extracts movement information representing bending and stretching of an imaging object from a plurality of images obtained from the imaging section, and determines whether or not the imaging object is a biological object, based on the movement information. According to embodiments described, a biometric authentication method and a computer readable medium storing a program are provided.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 is a flowchart depicting a determination process procedure;

FIG. 21 is a flowchart depicting a palm movement information representation normalization process procedure;

FIGS. 25A and 25B are diagrams depicting a palm region size normalization;

FIGS. 26A and 26B are diagrams depicting a palm region position normalization;

FIGS. 30A and 30B are image frame comparison diagrams;

FIG. 31 is a flowchart depicting a process procedure according to an embodiment;

DETAILED DESCRIPTION OF EMBODIMENTS

Figure 1:
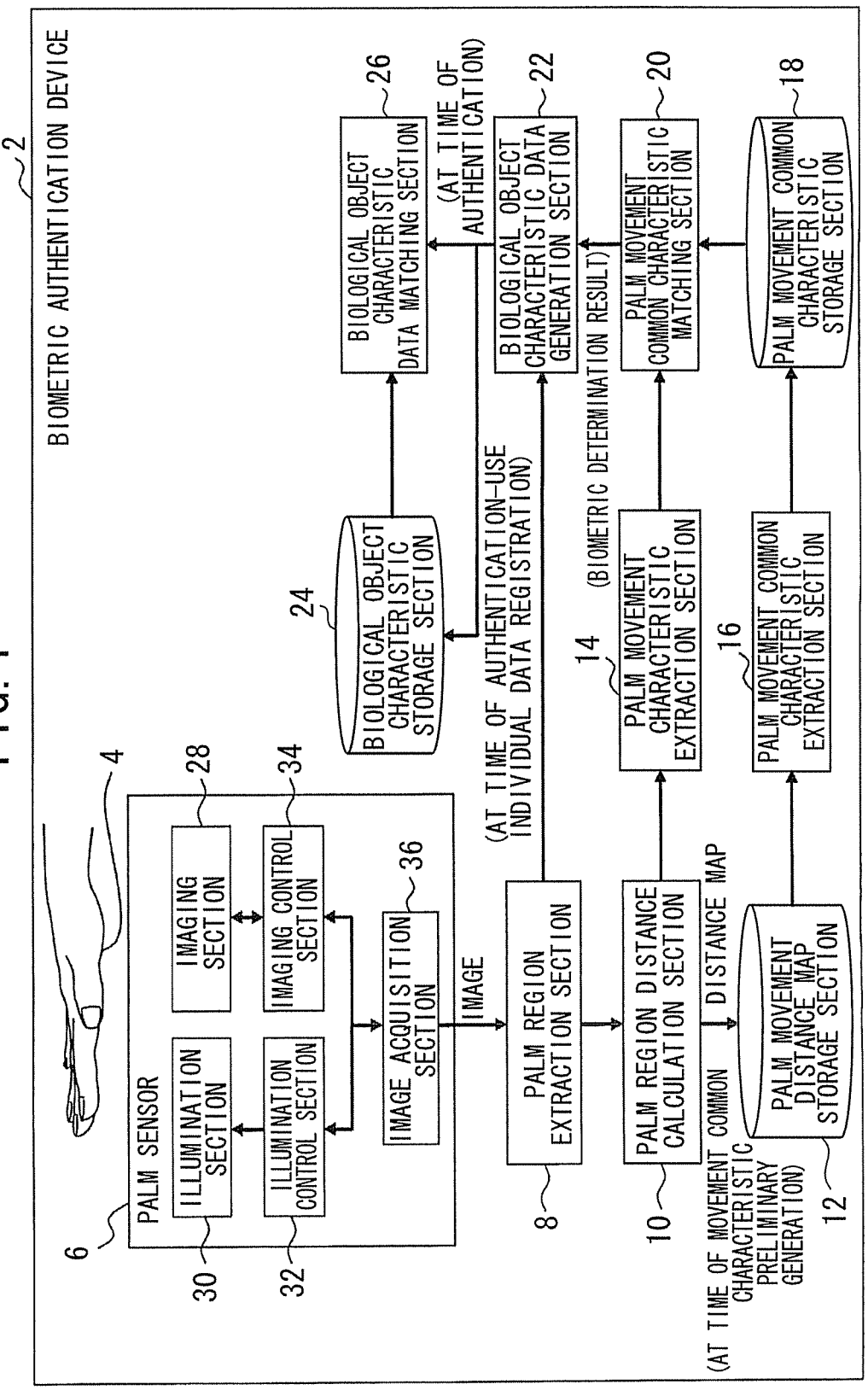
FIG. 1 depicts a biometric authentication device according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Figure 2:
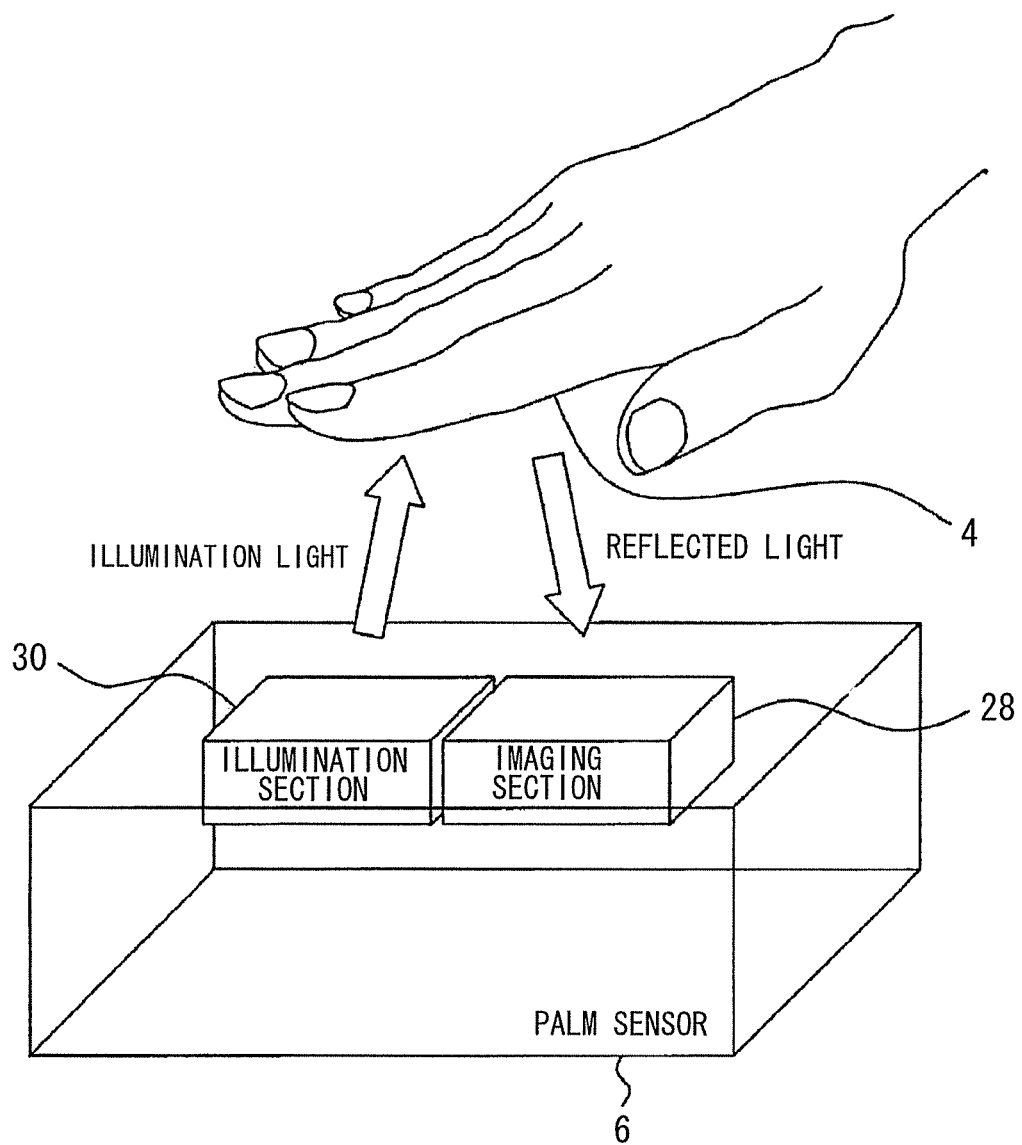
FIG. 2 depicts one example of an operation of a palm sensor.

FIGS. 1 and 2 will be referred to with regard to an embodiment. FIG. 1 depicts a biometric authentication device. FIG. 2 depicts one example of an operation of a palm sensor. The configurations shown in FIGS. 1 and 2 being examples, the invention is not limited to these kinds of configuration.

This biometric authentication device 2 is one example of an authentication device. The biometric authentication device 2 images (captures) an image including based on an operation of a palm shifting from an open state to a closed state, that is, an operation of shifting from an open state by for example a gripping operation, as bending and stretching of a biological object such as a hand, and acquires a plurality of images. Then, the biometric authentication device 2 obtains palm movement information from the images, and determines whether or not the imaged object is a human hand. In the event that the movement is not that of a human palm, the biometric authentication device 2 determines that the imaged object is not a palm, that is, not a biological object. The biometric authentication device 2 can be used in biometric authentication using vein recognition, and the like. A three-dimensional measuring technique based on brightness using active illumination is used for a measurement of a shape of an object of authentication with the biometric authentication device 2. The determination with the biometric authentication device 2 of whether or not an object is a biological object utilizes movements common to all humans, rather than individual movements of the person being checked. Then, the determination confirms a similarity with movement characteristics extracted from movement information based on a three-dimensional shape, rather than a similarity of operational images.

The biometric authentication device 2 takes, for example, a palm 4 as an object of determination, as a determination region of a biological object, as shown in FIG. 1. The biometric authentication device 2 includes a palm sensor 6, a palm region extraction section 8, a palm region distance calculation section 10, a palm movement distance map storage section 12, a palm movement characteristic extraction section 14, a palm movement common characteristic extraction section 16, a palm movement common characteristic storage section 18, a palm movement characteristic matching section 20, a biological object characteristic data generation section 22, a biological object characteristic storage section 24, and a biological object characteristic data matching section 26.

The palm sensor 6, being one non-limiting example of a biometric sensor which acquires an image from a biological object, a specific site of a biological object, or the like, is one example of a detection section which acquires from the palm 4, which is the object of determination, an image used in the determination of whether or not it is the person. The palm sensor 6 captures light reflected from the palm 4, which is illuminated with light, imaging the palm 4, and acquires images thereof. The palm sensor 6 includes an imaging section 28, an illumination section 30, an illumination control section 32, an imaging control section 34, and an image acquisition section 36. The imaging section 28, being one example of an imaging section which images the palm 4, is an imaging instrument such as a digital camera. The imaging section 28 acquires images for reading a vascular pattern of the palm 4. This embodiment acquires images capturing a movement from an open state to a closed state of the palm 4, and images capturing a movement from the closed state to the open state of the palm 4. The imaging control section 34 controls the number of imagings in accordance with the timing of the imaging, and the operational shift of the palm 4.

The illumination section 30 is one example of a illuminating section which illuminates the palm 4, which is the object of determination, with light. The illumination section 30 includes two functions. A first function is a function which uniformly illuminates the palm 4 with light in order to read the vascular pattern of the palm 4. A second function is a function which, in order to measure a distance from the palm sensor 6 (imaging section 28) to the palm 4, emits a beam of light in a known direction differing from an optical axis of the imaging section 28. It is sufficient that the light used in the imaging is of a wavelength within the detection range of the imaging section 28. As shown in FIG. 2, the palm 4, which receives the illumination light from the illumination section 30, reflects the light. The imaging section 28, which captures the reflected light, images the palm 4. The illumination control section 32 controls the light of the illumination section 30, and an emission amount thereof.

The image acquisition section 36 acquires the images obtained by the imaging section 28. Image information output from the image acquisition section 36 is added to the palm region extraction section 8.

The palm region extraction section 8 is one example of an extraction section which extracts a region of a biological object. In an embodiment, the palm region extraction section 8, being a unit extracting a palm region which is an object of determination information, extracts a palm region using, for example, an image processing.

The palm region distance calculation section 10 is one example of a calculation section which calculates a distance of a biometric region. In an embodiment, the palm region distance calculation section 10, being a processing section which calculates a distance of an optional portion of the palm 4, which is the object of determination, whose position is known, calculates a distance of the palm region based on the image information. A relative reflection coefficient of the palm 4 with respect to a reference object can be calculated based on an image which images a reference object having a uniform identical reflection coefficient existing at a known distance, and on an optional distance, whose position is known, at which the palm 4 exists. The palm region distance calculation section 10, using this relative reflection coefficient, calculates the distance between the palm sensor 6 and the palm region by using, for example, a principle wherein the strength of the light is inversely proportional to the square of the distance.

The palm movement distance map storage section 12 is an example of a biological object movement distance map storage section. The palm movement distance map storage section 12, being, for example, a data storage section, stores a distance map generated from the distance calculated with the palm region distance calculation section 10.

The palm movement characteristic extraction section 14 is one example of a processing section which extracts movement characteristics of a biological object. In an embodiment, the palm movement characteristic extraction section 14 extracts movement characteristics of the palm 4. The palm movement characteristic extraction section 14 extracts the movement characteristics of the palm 4 based on the palm region distance calculated by the palm region distance calculation section 10.

The palm movement common characteristic extraction section 16 is one example of a processing section which extracts biological object movement common characteristics. In an embodiment, the palm movement common characteristic extraction section 16 is a processing section which extracts characteristics common to movements of the palm 4. The palm movement common characteristic extraction section 16 extracts common characteristics of the movements of the palm 4 based on a distance map, which expresses the movements of the palm 4, stored in the palm movement distance map storage section 12.

The palm movement common characteristic storage section 18 is one example of a storage section which stores biological object movement common characteristics. For example, the palm movement common characteristic storage section 18, being a data storage section, stores the common characteristics of the movements of the palm 4 extracted with the palm movement common characteristic extraction section 16.

The palm movement characteristic matching section 20 is one example of a matching section which matches movement characteristics of a biological object. In an embodiment, the palm movement characteristic matching section 20 is one example of a determination section which matches the movement characteristics of the palm 4, and determines whether or not it is a biological object. The palm movement characteristic matching section 20 matches the movement characteristics of the palm 4 at a time of registration or a time of authentication, and outputs a matching result as a result of the determination of whether or not it is a biological object.

The biological object characteristic data generation section 22 is one example of a processing section which generates biological object characteristic data. The biological object characteristic data generation section 22 generates biological object characteristic data using palm region information from the palm region extraction section 8, and palm movement characteristic information from the palm movement characteristic matching section 20.

The biological object characteristic storage section 24 is one example of a storage section which stores biological object characteristic data. The biological object characteristic storage section 24 stores, for example, personal authentication data such as vein recognition data.

The biological object characteristic data matching section 26 is one example of a matching section which matches biological object characteristic data at a time of authentication. The biological object characteristic data matching section 26 matches registration data stored in the biological object characteristic storage section 24, and the biological object characteristic data obtained by the biological object characteristic data generation section 22. Depending on whether or not the biological object characteristic data, which are the object of determination, match the registration data, the biological object characteristic data matching section 26 determines whether or not the person being checked is a registered person. That is, after the determination that the person being checked is a biological object, an authentication of whether or not he or she is a registered person is carried out.

Figure 3:
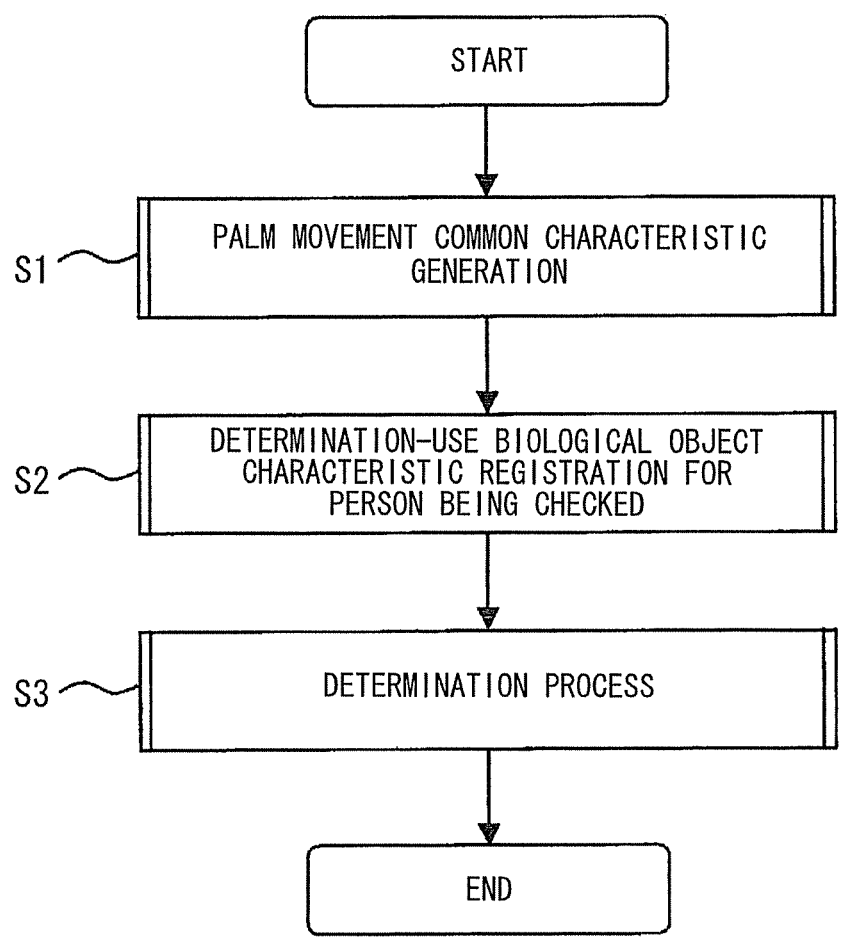
FIG. 3 is a flowchart depicting a comprehensive biometric determination process.
Figure 4:
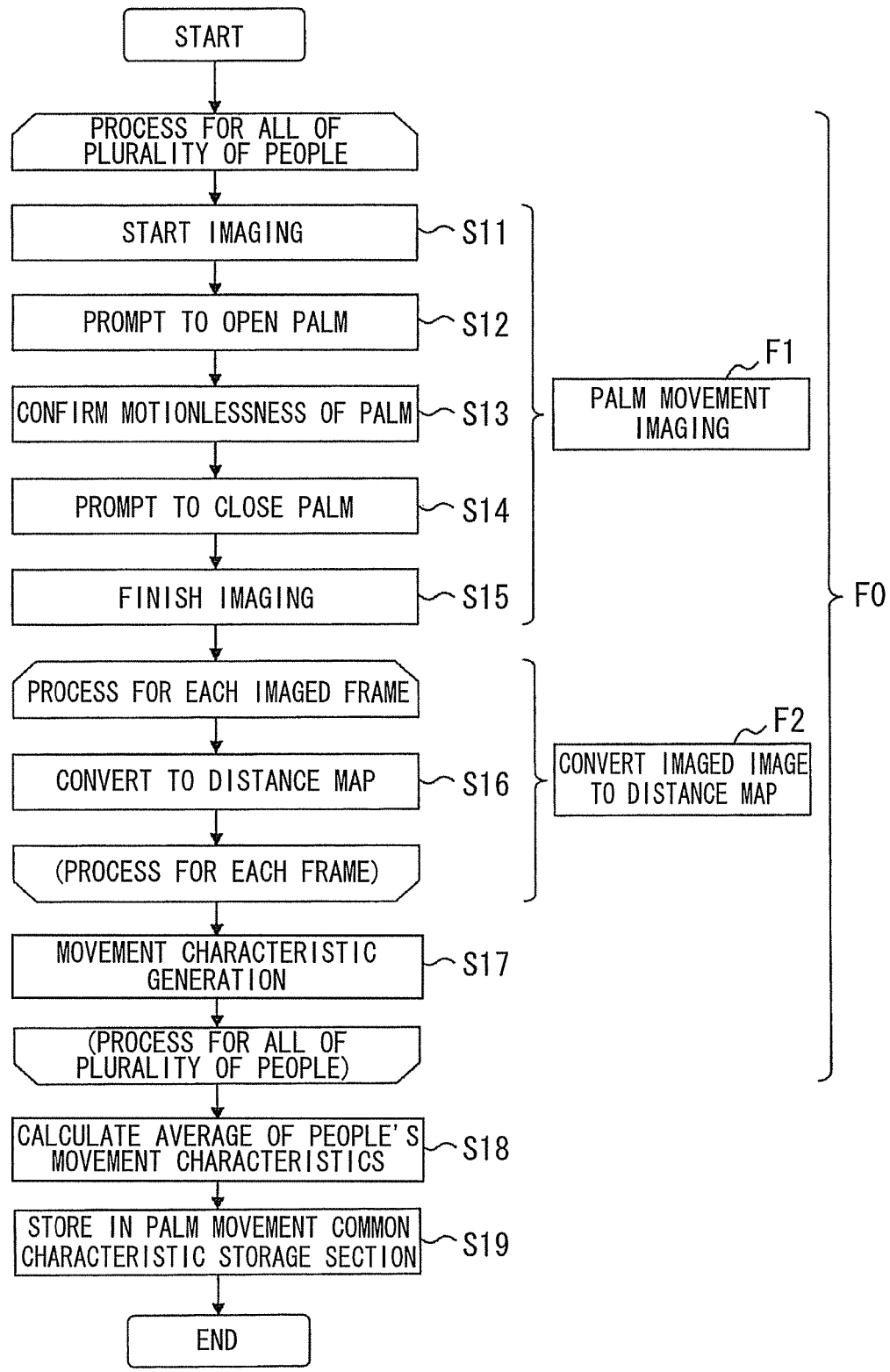
FIG. 4 is a flowchart depicting a palm movement common characteristic generation process procedure.
Figure 5:
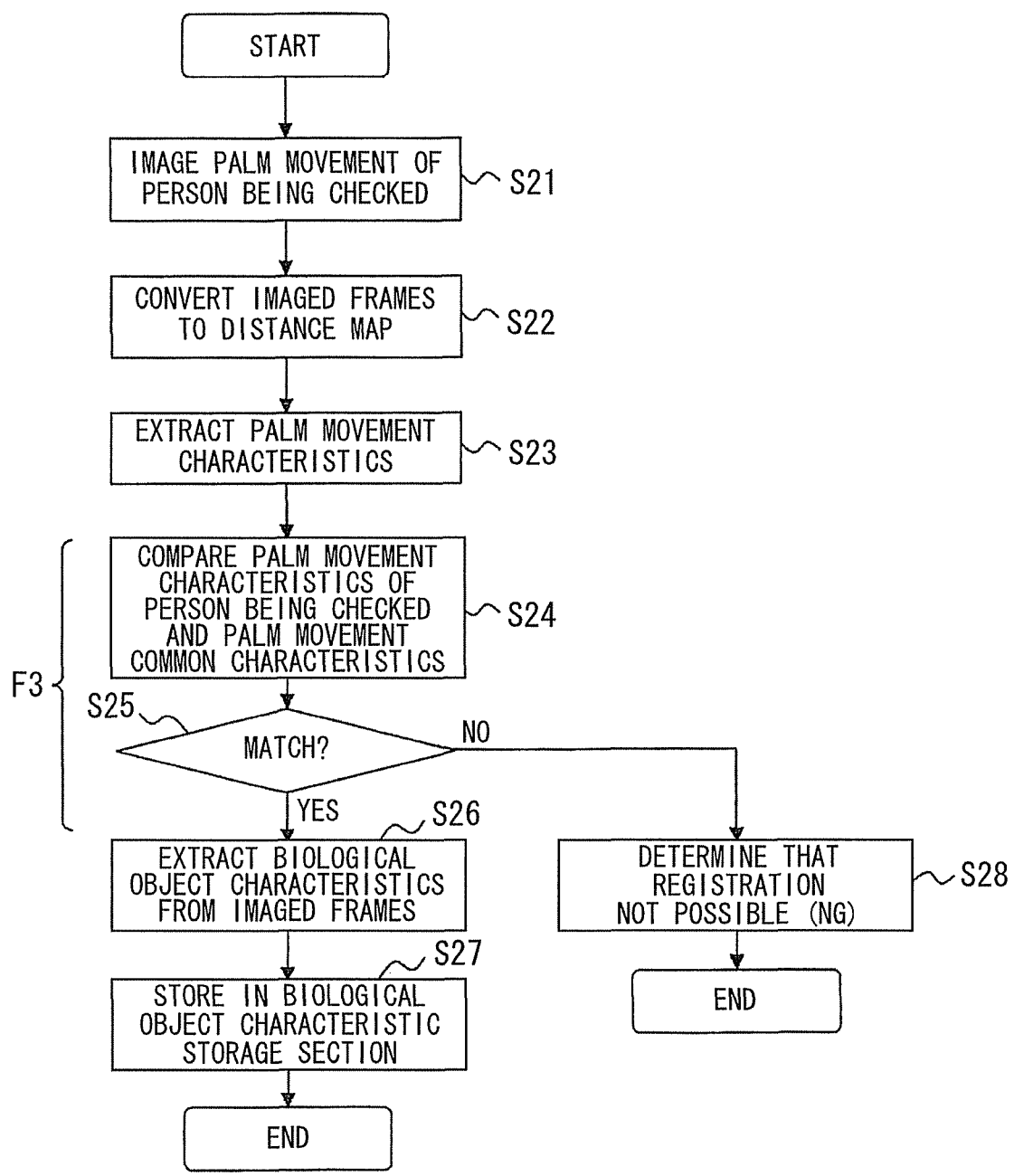
FIG. 5 is a flowchart depicting a determination-use biological object characteristic registration process procedure for a person being checked.

Next, FIGS. 3 to 6 will be referred to with regard to the determination of whether or not the person being checked is a biological object. FIG. 3 is a flowchart depicting a comprehensive biometric determination process. FIG. 4 is a flowchart depicting a palm movement common characteristic generation process procedure. FIG. 5 is a flowchart depicting a determination-use biological object characteristic registration process procedure. FIG. 6 is a flowchart depicting a procedure of the determination process. The processes shown in FIGS. 3 to 6 being examples, the invention is not limited to these processes.

In this biometric determination, a process procedure (FIG. 3) is used which carries out a determination using characteristic information of a movement, for example, an operation of shifting from an open state to a closed state, of the palm 4 as the biological object. This process procedure is one example of a process carried out using a biometric authentication method or biometric authentication program. As shown in FIG. 3, the process procedure generates palm movement common characteristics (operation S1), registers determination-use biological object characteristics of the person being checked (operation S2), and carries out the determination process using the registered information (operation S3). As sub-routines of the main routine, which is this process procedure, the palm movement common characteristic generation process procedure (FIG. 4), the determination-use biological object characteristic registration process procedure for the person being checked (FIG. 5), and the determination process procedure (FIG. 6) are executed.

As shown in FIG. 4, the palm movement common characteristic generation process procedure includes stages of a process for all of a plurality of people (F0), an imaging of a movement of the palm 4 of the plurality of people (F1), and a conversion to a distance map of each image obtained by the imaging (F2). By means of this process procedure, palm movement common characteristics are extracted based on the distance maps of the plurality of people.

As the process F0 for all of the plurality of people, the process procedure starts imaging (operation S11), and prompts the person being checked to open the palm 4 (operation S12). The person being checked, complying with the prompt, opens the palm 4, putting it into the open state. At this point, a motionlessness of the palm 4 is confirmed (operation S13). Next, the process procedure prompts the person being checked to close the palm 4 from the motionless state (operation S14), images the palm 4 during the shift in state from the open state to the closed state, and acquires a plurality of images. Subsequently, the process procedure finishes the imaging (operation S15), carries out a conversion to a distance map as a processing of each imaged frame (operation S16), executes processing for each frame, and generates movement characteristics (operation S17) across data captured for the plurality of people (users). Continuing, the process procedure calculates an average of each person's movement characteristics from the plurality of images acquired (operation S18), stores it in the palm movement common characteristic storage section 18 (operation S19), and finishes the process.

The determination-use biological object characteristic registration process procedure for the person being checked includes a matching process F3 (FIG. 5) with movement common characteristics executed before the registration. As shown in FIG. 5, the process procedure images the movement of the palm 4 of the person being checked (operation S21), converts the imaged frame into a distance map (operation S22), and extracts movement characteristics of the palm 4 (operation S23). After this process is finished, the previously mentioned matching process F3 is executed.

The matching process F3 compares the palm movement characteristics of the person being checked with the palm movement common characteristics (operation S24), and carries out a determination of whether or not they match (operation S25). If it is determined that they match (operation S25: Yes) in the matching process F3, the process procedure extracts biological object characteristics from the image frame obtained by the imaging (operation S26), stores the biological object characteristics in the biological object characteristic storage section 24 (operation S27), and finishes the process.

Also, if there is no match in operation S25 (operation S25: No), the matching process F3 determines that registration is not possible (NG) (operation S28), and finishes the process.

The determination process procedure, including a matching of the movement extracted from the image and the common characteristics (F4), and a matching of the biological object characteristics extracted from the image frame and the registered biological object characteristics (F5), carries out a determination of whether or not the palm is a biological object based on these matchings. Therein, as shown in FIG. 6, the process procedure images the movement of the palm 4 of the person being checked (operation S31), and converts the imaged frame into a distance map (operation S32). Also, the process procedure extracts movement characteristics of the palm 4 from the imaged frame (operation S33), compares the palm movement characteristics of the person being checked with the palm movement common characteristics (operation S34), and carries out a determination of whether or not they match (operation S35). If it is determined that they match (operation S35: Yes), the process procedure extracts biological object characteristics from the imaged frame (operation S36), retrieves the registered biological object information of the person being checked from the biological object characteristic storage section 24 (operation S37), and compares the biological object characteristics extracted from the imaged frame and the biological object characteristics retrieved from the biological object characteristic storage section 24 (operation S38). The process procedure, based on the comparison, carries out a determination of whether or not there is a match (operation S39) and, if there is a match (operation S39: Yes), determines that registration is possible (operation S40), while if there is no match (operation 839: No), it determines that registration is not possible (NG) (operation S41), and finishes the process.

Also, if there is no match in operation S35 (operation S35: No), the process procedure determines that registration is not possible (NG) (operation S41), and finishes the process.

Figure 7A:
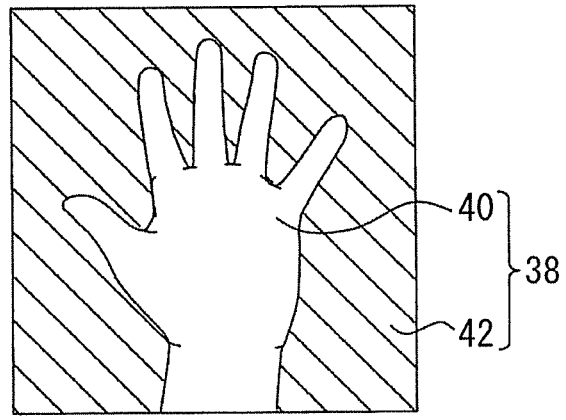
FIGS. 7A, 7B and 7C are diagrams for illustrating an extraction of a palm region.
Figure 7B:
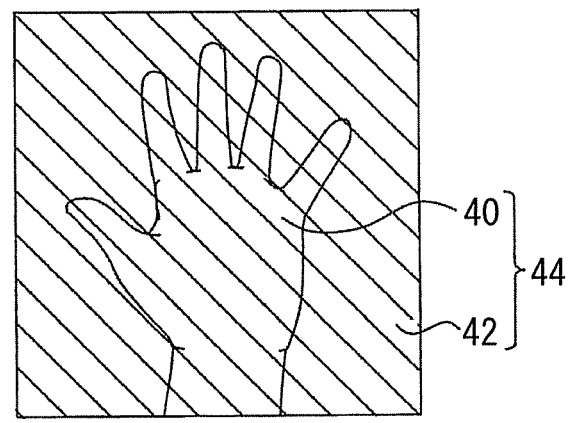
Figure 7C:
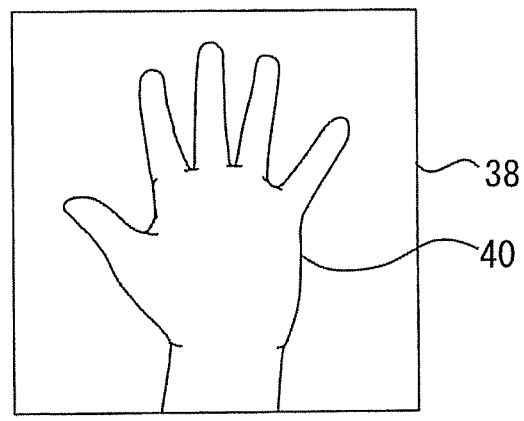
Figure 8:
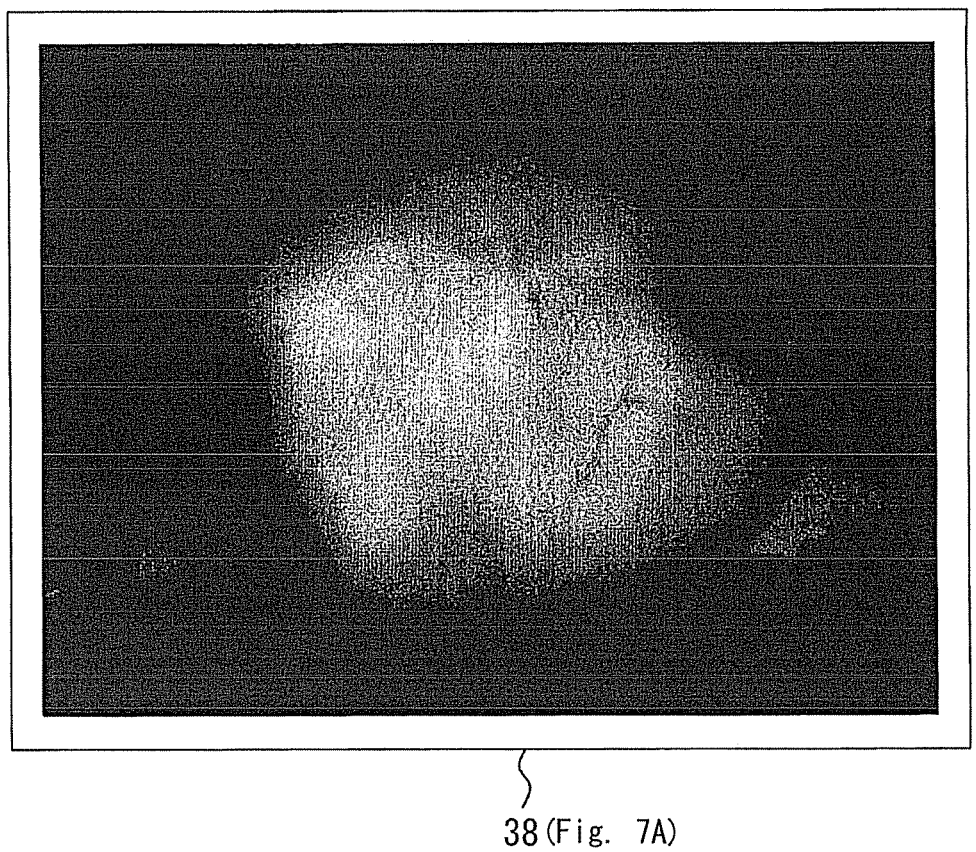
FIG. 8 is a photograph depicting an image depicting a palm in a condition in which there is illumination.
Figure 9:
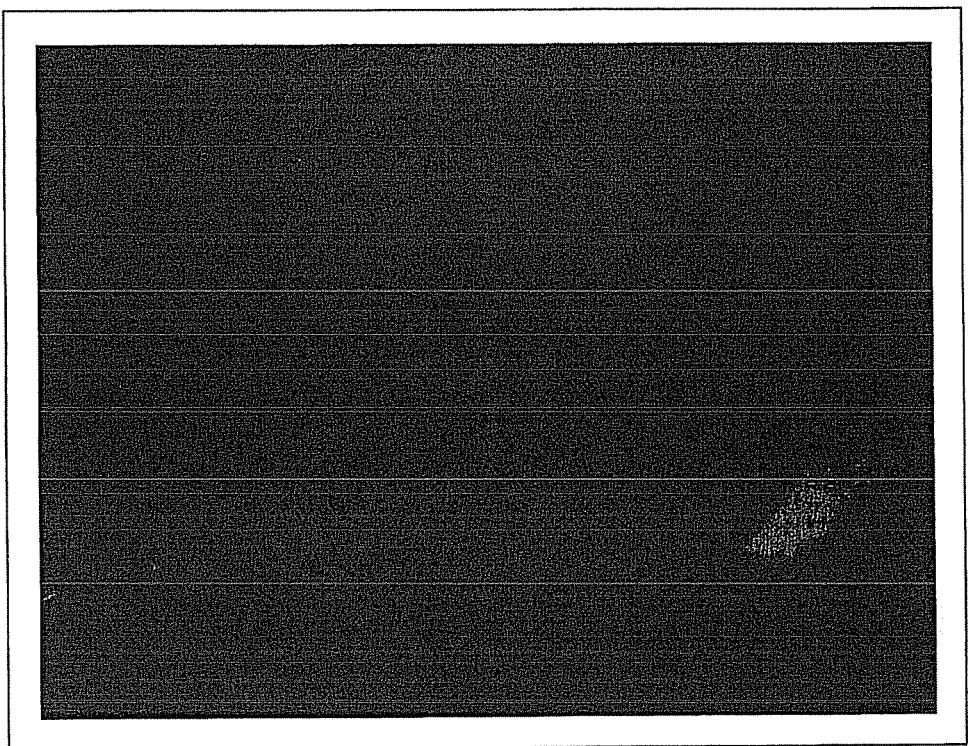
FIG. 9 is a photograph depicting an image of a palm in a condition in which there is no illumination.

Next, FIGS. 7A, 7B, 7C, 8, and 9 will be referred to with regard to the extraction of the palm region. FIGS. 7A to 7C are diagrams for illustrating the extraction of the palm region. FIG. 8 is a photograph illustrating an image illustrating the palm in a condition in which there is illumination. FIG. 9 is a photograph illustrating an image illustrating the palm in a condition in which there is no illumination. FIGS. 7A to 7C, 8, and 9 being examples, the invention is not limited to these configurations.

The strength of the illumination of the palm 4 is adjusted or set in connection with the extraction of the palm region. Taking a range within a certain distance, for example, approximately 10 cm., from the illumination section 30 as an illumination limit, the strength is set so as the light does not reach beyond the range. In the case of this kind of setting, the person being checked holds the palm 4 over the palm sensor 6 in such a way that it is at a distance within approximately 10 cm. from the palm sensor 6. The imaging section 28 takes an image in which the palm 4 receiving light is imaged (FIGS. 7A and 8), and an image in which the palm 4 is imaged with the light extinguished (FIGS. 7B and 9). In an image 38 obtained by imaging the palm 4 receiving light, a background image 42 appears together with an image 40 representing the palm 4, as shown in FIG. 7A. In an image 44 obtained by imaging the palm 4 with the light extinguished, the image 40 representing the palm 4, and the background image 42, both appear dimly, as shown in FIG. 7B.

Therein, by calculating a difference between the images 38 and 44, a portion (the background image 42) other than the image 40 representing the palm 4 is removed from the image 44, as shown in FIG. 7C. As a result, a clear image 40 of the palm 4 is obtained. That is, the palm region can be extracted as a region in the difference image in which a luminance value is not zero, that is, as a region in the difference image which has a luminance value equal to or greater than a certain threshold value. FIG. 8 is an actual image wherein the palm 4 receiving light is imaged. FIG. 9 is an actual image wherein the palm 4 is imaged with the light extinguished.

To describe in more detail, the following kind of process is carried out in the extraction of the palm region. An image obtained by illuminating the palm 4 with light, and imaging, is taken to be $I_{on}(x,y)\{0<x<w, 0<y<h\}$. This being a two-dimensional array, a luminosity value is stored in each element as an unsigned 8 bit integer. w indicates the width of the image, while h indicates the height of the image.

An image obtained by extinguishing the illumination section 30, and imaging the palm 4 with no illumination light, is taken to be $I_{off}(x,y)\{0<x<w, 0<y<h\}$.

The difference between the two images is taken for each element of these arrays, that is, each (i,j) pair of $0<i<w, 0<j<h$. When the absolute value of the difference is less than a predetermined threshold value t, it is determined that the elements of the arrays (pixels in the image) are not the palm region. This is expressed by the following kind of formula (1).

$$|I_{on}(x,y)-I_{off}(x,y)| \geq t \tag{1}$$

It is determined that pixels (i,j) which satisfy the formula (1) are the palm region, while pixels which do not satisfy the formula (1) are not the palm region.

Figure 10:
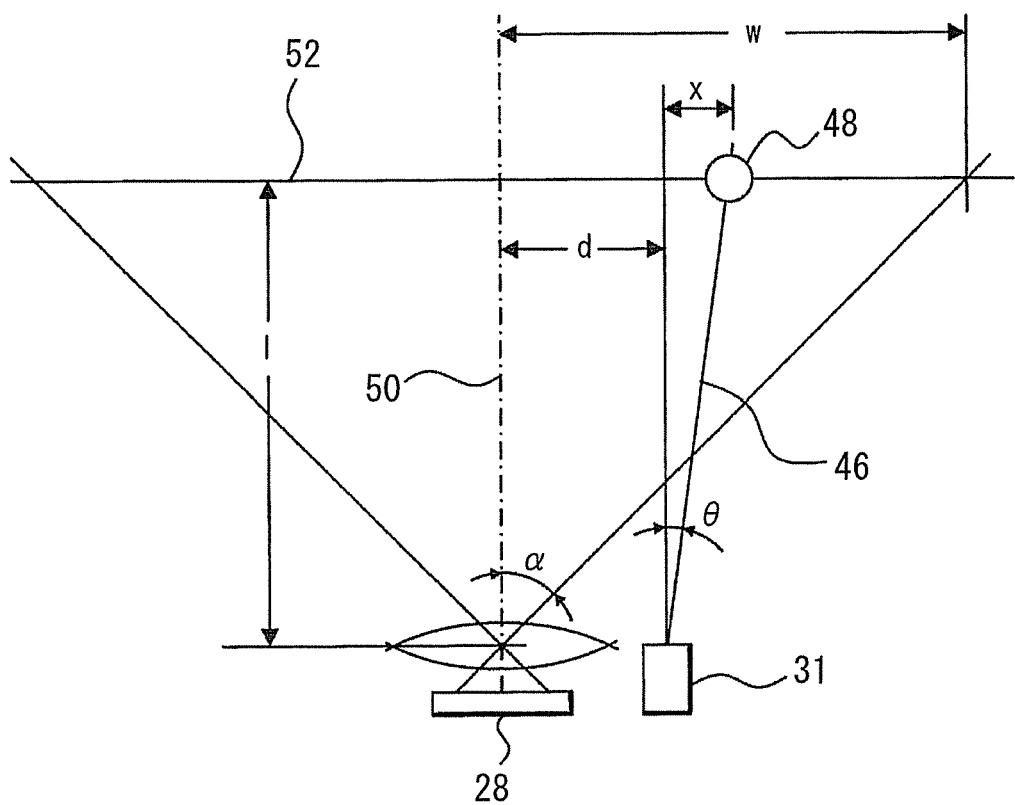
FIG. 10 is a diagram for illustrating a height detection principle.
Figure 11:
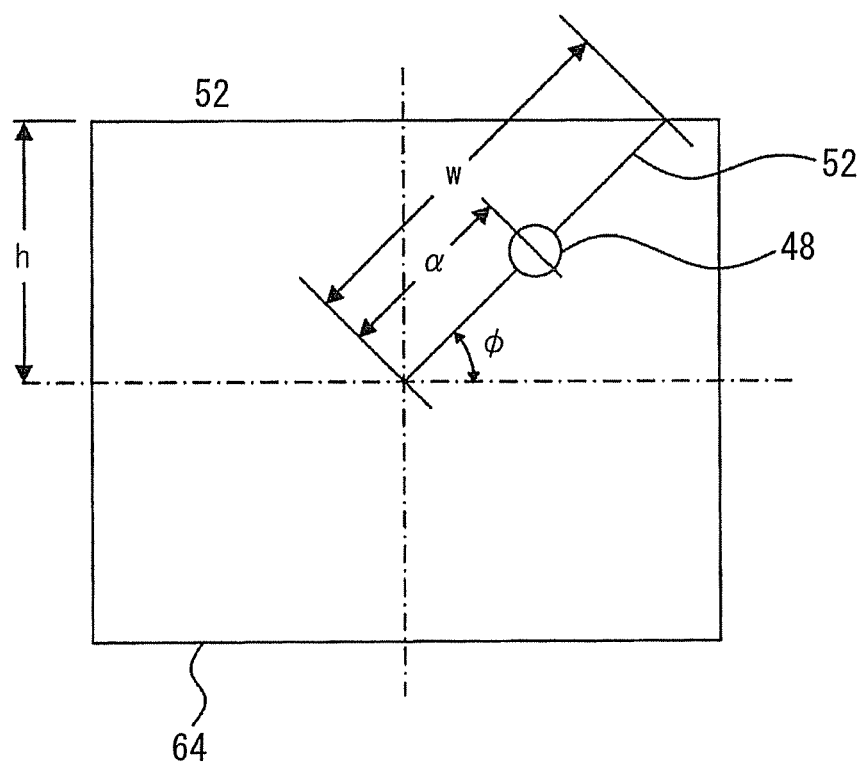
FIG. 11 is a diagram illustrating calculating of a height.
Figure 12:
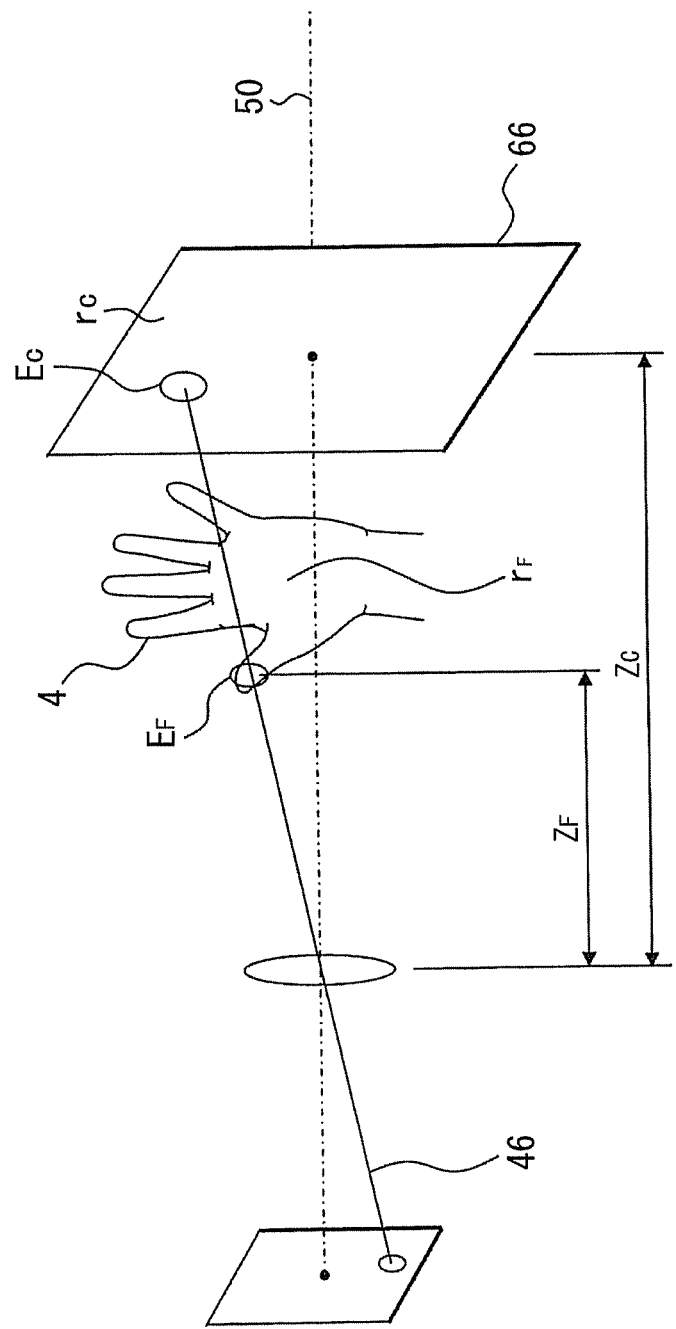
FIG. 12 is a diagram for illustrating a principle of carrying out a conversion of a distance using a reflection coefficient.
Figure 13:
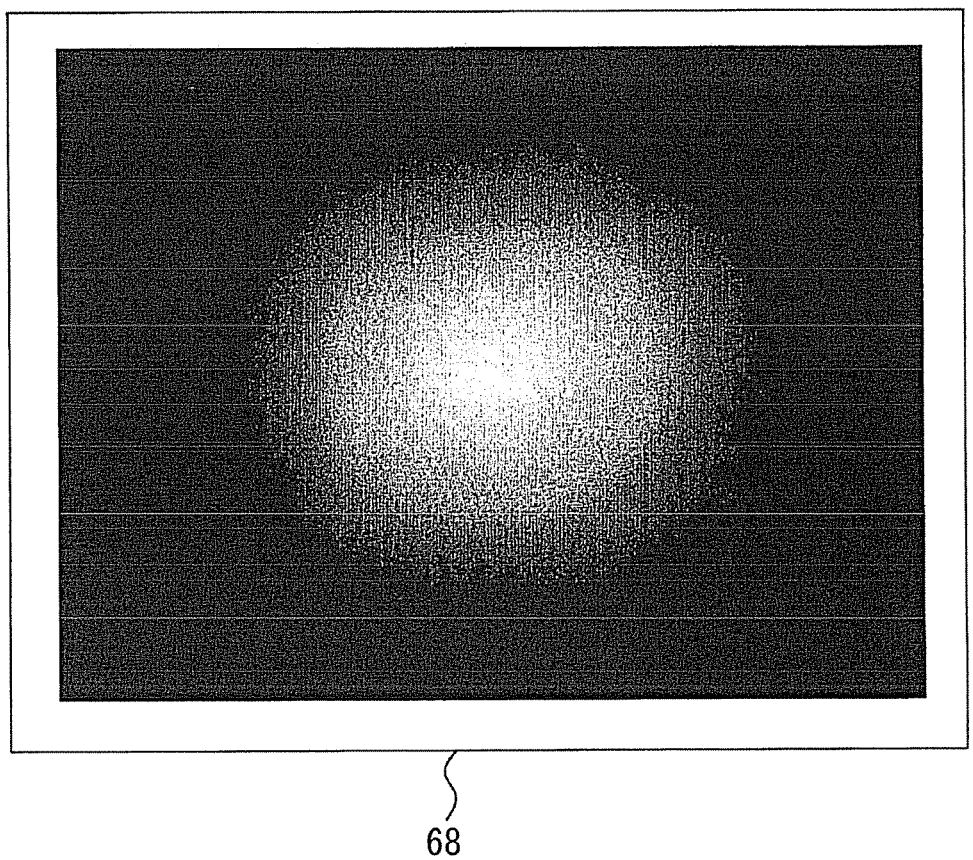
FIG. 13 depicts an image of a calibration surface.
Figure 14:
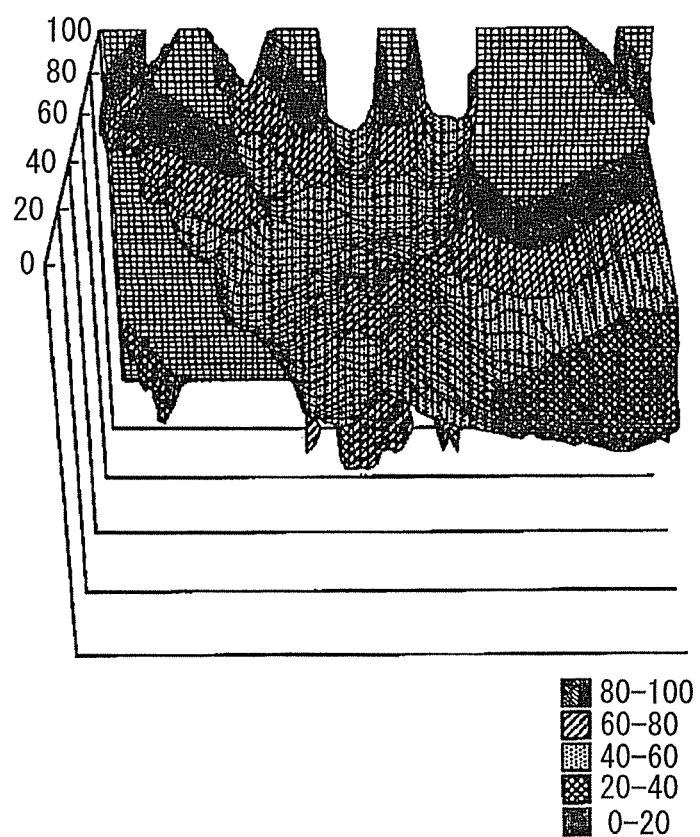
FIG. 14 depicts a distance map.
Figure 15:
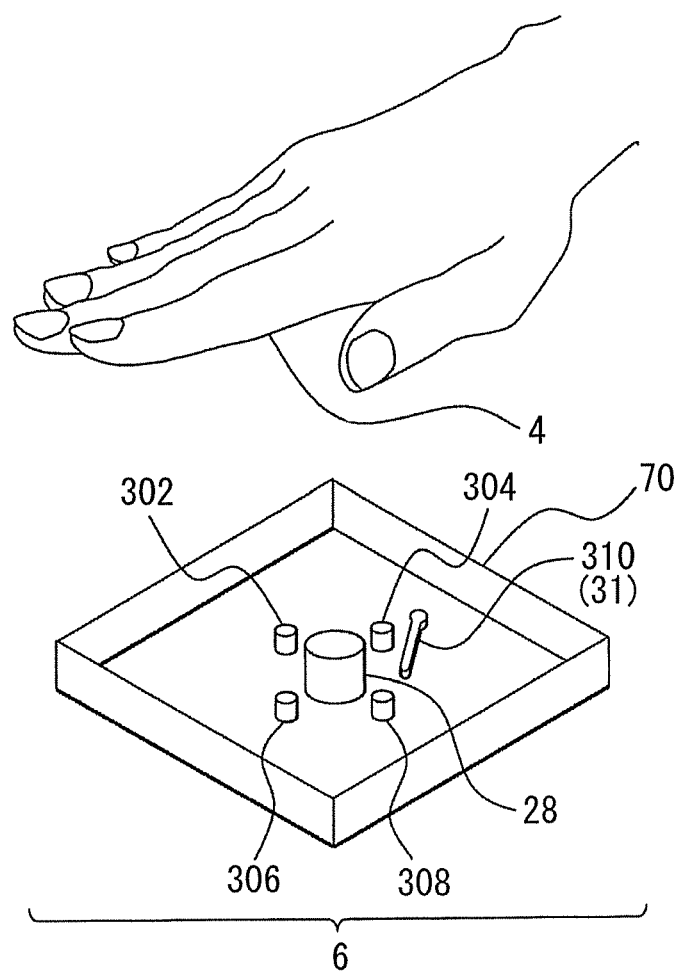
FIG. 15 depicts a palm sensor used in a distance map generation.
Figure 16:
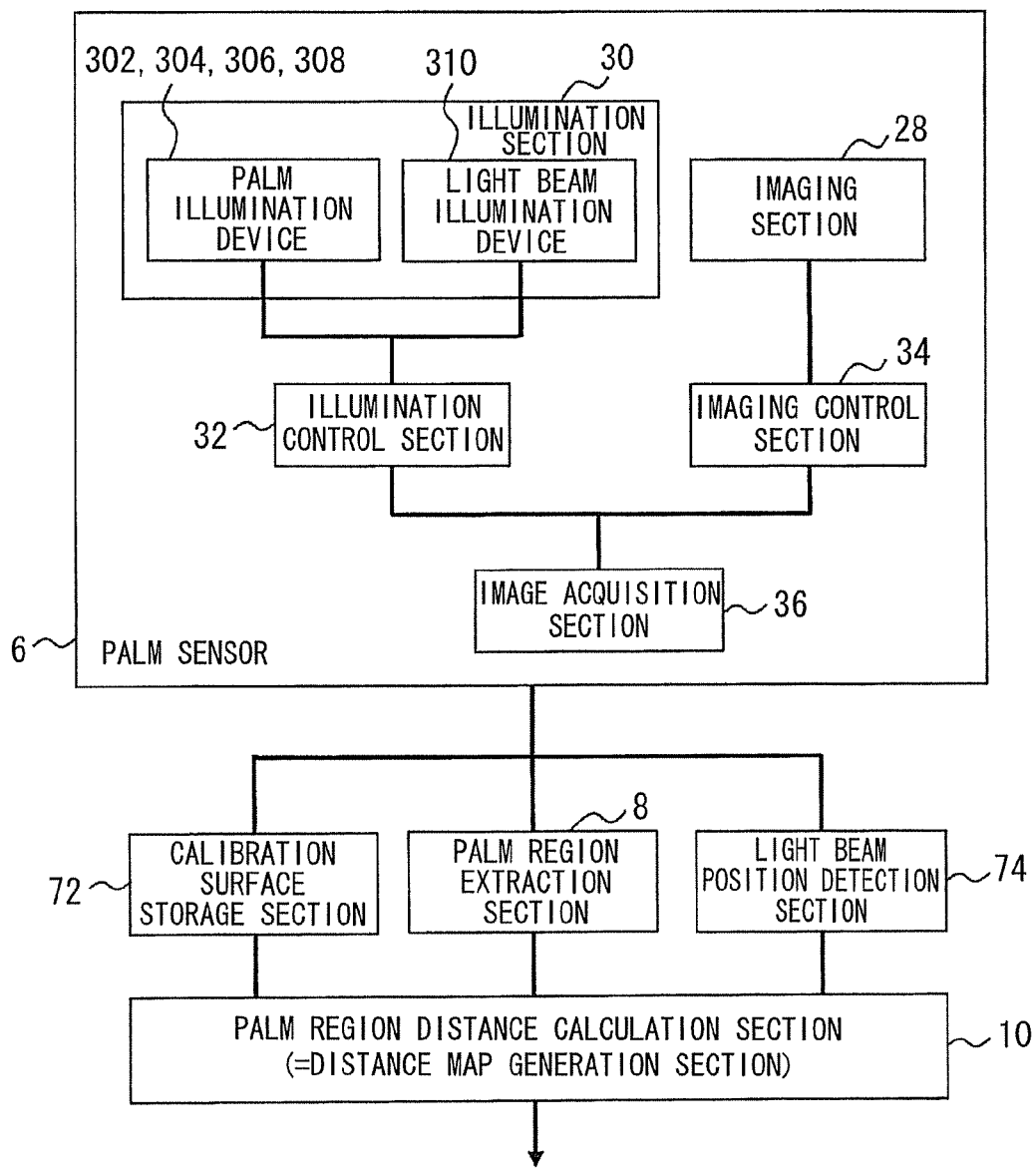
FIG. 16 depicts a distance map generation function section.
Figure 17:
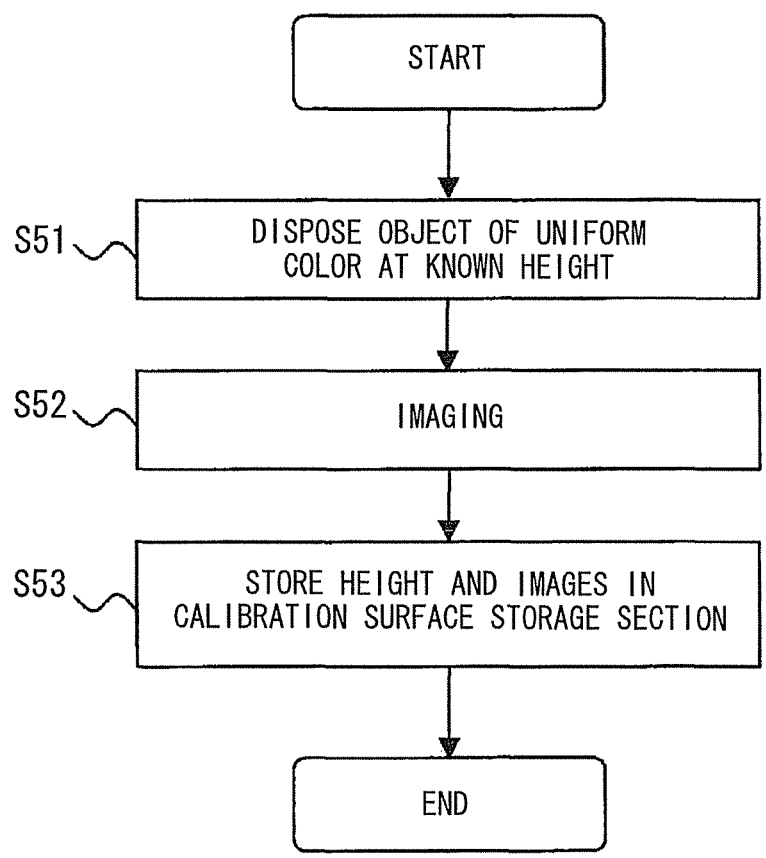
FIG. 17 is a flowchart depicting a procedure of a preliminary process for a distance map generation.
Figure 18:
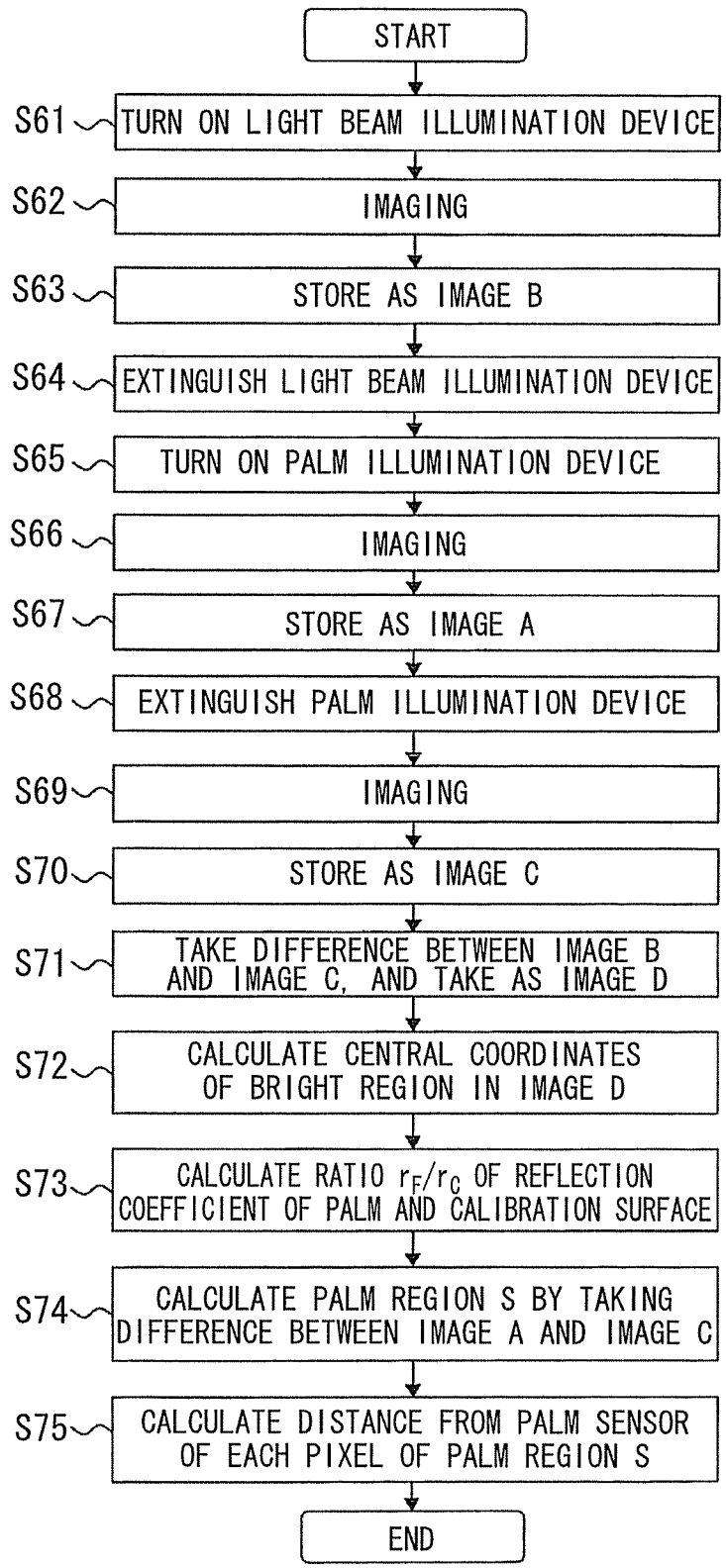
FIG. 18 is a flowchart depicting a procedure of an execution process for a distance map generation.
Figure 19:
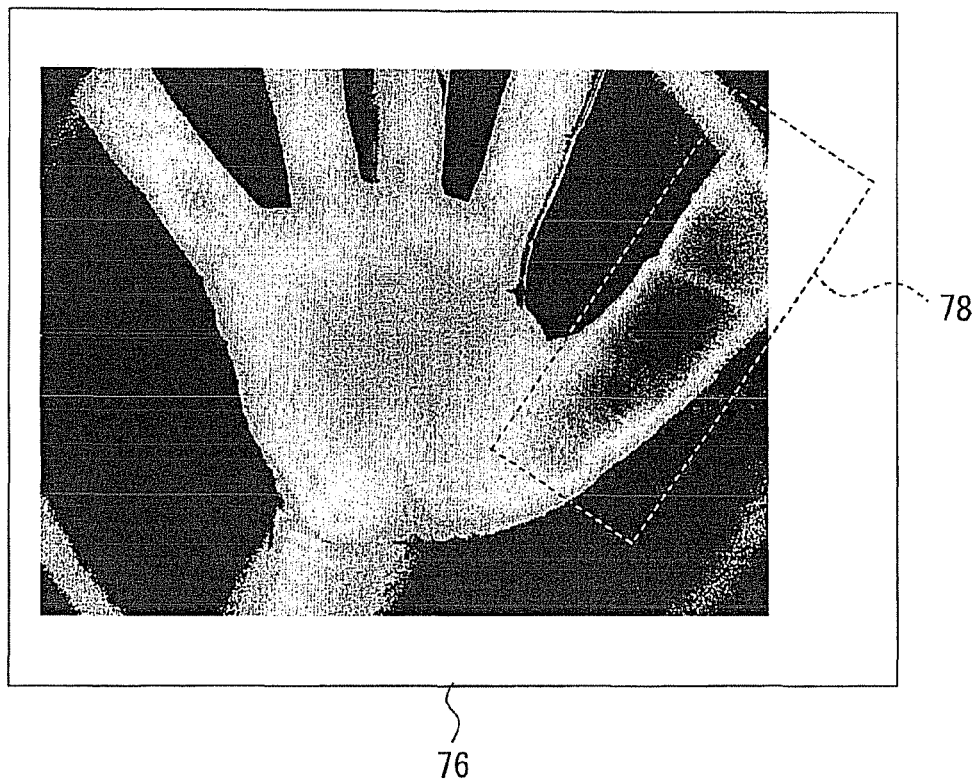
FIG. 19 is a photograph depicting a palm region distance calculation example.

Next, FIGS. 10 to 19 will be referred to with regard to calculation of a palm region distance and a distance map. FIG. 10 is a diagram for illustrating a height detection principle. FIG. 11 is a diagram for calculating a height. FIG. 12 is a diagram for illustrating a principle of carrying out a conversion of a distance using a reflection coefficient. FIG. 13 depicts an image of a calibration surface. FIG. 14 depicts a distance map. FIG. 15 depicts a palm sensor used in a distance map generation. FIG. 16 depicts a distance map generation function section. FIG. 17 is a flowchart depicting a procedure of a preliminary process for a distance map generation. FIG. 18 is a flowchart depicting a procedure of an execution process for a distance map generation. FIG. 19 is a photograph depicting a palm region distance calculation example. FIGS. 10 to 19 being examples, the invention is not limited to them.

In FIGS. 12, 15, and 16, portions that are the same as those in FIG. 1 are given the same reference numerals and characters as in FIG. 1.

In the calculation of the distance to the palm region, a height I is calculated of a position 48 on the palm 4 where a light beam 46 illuminated from a light source 31 hits, as shown in FIG. 10. The light source 31 which emits the light beam 46 is disposed in a position a distance d away from the imaging section 28, within a plane 52 which intersects perpendicularly with an optical axis 50 of the imaging section 28, including a lens focal point. The direction of the light beam 46 has a tilt of an angle θ with respect to the optical axis 50 of the imaging section 28, in the case of FIG. 10, with respect to the central axis of the light source 31, which is parallel to the optical axis 50, within a plane including the imaging section 28, its optical axis 50, and the light source 31.

Taking a half of the field angle of the imaging section 28 as α, and the height from the lens focal point to the palm 4 as I, the angle formed by the plane 52, including the imaging section 28 and light source 31, with the horizontal axis of an image 64 is taken as φ (FIG. 11). Then, it is taken that edges of the plane 52 and image 64 intersect, as shown in FIG. 11. As a relative relationship of the position 48 of the light beam 46 and the edge of the image 64 in the image 64, and their relative relationship in the actual world, are identical, the following formula (2) is established.

$$\frac{a}{W} = \frac{d + l\tan\theta}{l\tan\alpha} \quad (2)$$

Note that W=h/sin φ, and a=d+x. By solving the formula (2) based on the height I of the palm 4, the following formula (3) is obtained.

$$l = \frac{d}{\frac{a}{W}\tan\alpha - \tan\theta} \quad (3)$$

According to the formula (3), the height I of the palm 4 is obtained based on the position 48 in the image 64 where the light beam 46 hits. The position 48 in the image 64 where the light beam 46 hits is obtained by taking the difference between an image for which the light beam 46 is turned on and an image for which the light beam 46 is extinguished, and calculating the coordinates of the center of a region which appears brightly in the difference image.

Next, a description will be given, referring to FIG. 12, of the principle of carrying out a conversion of a distance using a reflection coefficient, utilizing a measurement result which acts as a reference. As shown in FIG. 12, it is taken that paper of a uniform color is disposed at a known height $Z_C$, and an image relating to a brightness on an imaged calibration surface 66 is obtained. Actually, an image 68 shown in FIG. 13 is obtained as the calibration surface 66. As the brightness diminishes in inverse proportion to the square of the distance, the six variables in FIG. 12 are obtained from the following formula (4).

$$Z_F = \sqrt{\frac{r_F E_C}{r_C E_F}} Z_C \quad (4)$$

By this means, when using the light beam 46, a luminosity $E_F$ at a measurement point on the palm 4 and a distance $Z_F$ are known, so a ratio $r_F/r_C$ of the reflection coefficient is obtained. On knowing the reflection coefficient ratio $r_F/r_C$, as the luminosity $E_F$ at points other than the measurement point are known with the light beam 46, it is possible to calculate the distance $Z_F$ of each point. $E_C$ is the luminosity of the calibration surface 66, $Z_C$ is the distance between the lens focal point and the calibration surface 66, $r_C$ is a diffuse reflection coefficient of the calibration surface 66, $E_F$ is the luminosity of the palm 4 (the object), which is the object of measurement, $Z_F$ is the distance between the lens focal point and the palm 4, and $r_F$ is a diffuse reflection coefficient of the palm 4.

Next, the distance map of the palm 4 is obtained. A two-dimensional array in which is stored the previously mentioned distance $Z_F$ is defined in each element of a two-dimensional array of the same size as the image of the palm 4. The two-dimensional array being an array which has distances as elements, it is called a "distance map". When the distance map is visualized using CG technology so that its contours can be seen, the kind of visualized distance map shown in FIG. 14 is obtained.

The palm sensor 6 including a distance map generation function includes the imaging section 28 in the center of a light blocking frame 70, and includes palm illumination devices 302, 304, 306 and 308 as a plurality of illumination sections 30, and a light beam illumination device 310 (the light source 31), on the periphery of the imaging section 28, as shown in FIG. 15. The palm illumination devices 302, 304, 306 and 308 are light sources which illuminate the whole of the palm. The light beam illumination device 310 is a light source which emits the light beam 46.

In the event that this kind of palm sensor 6 is used, a calibration surface storage section 72 and a light beam position detection section 74 are provided, as shown in FIG. 16, as a configuration for realizing the distance map generation function. The calibration surface storage section 72, being a predetermined storage medium, stores the height, image, and the like of the calibration surface 66 as the previously mentioned information relating to the calibration surface 66. The light beam position detection section 74 detects a position hit by the light beam 46. The palm region distance calculation section 10, based on the information relating to the calibration surface 66, the palm region, and the light beam position, calculates the distance of the palm region, and generates a distance map. Therefore, the palm region distance calculation section 10 is one example of a distance map generation section.

The generation of the distance map is such that, after the preliminary process (FIG. 17), the execution process (FIG. 18) is carried out. The procedure of the preliminary process is that of the previously mentioned process using the calibration surface 66. As shown in FIG. 17, firstly, the process procedure disposes an object (the calibration surface 66) of a uniform color at a known height (operation S51). Subsequently, the process procedure carries out an imaging of the calibration surface 66 (operation S52), stores the height and image of the calibration surface 66 in the calibration surface storage section 72 (operation S53), and finishes the preliminary process.

Also, the execution process procedure, as shown in FIG. 18, turns on the light beam illumination device 310 (operation S61), and carries out an imaging of the palm 4 using the light beam 46 (operation S62). The process procedure stores the image obtained by the imaging in the calibration surface storage section 72 as an image B (operation S63).

Next, the process procedure extinguishes the light beam illumination device 310 (operation S64), and turns on the palm illumination devices 302, 304, 306 and 308 (FIG. 16) (operation S65), illuminating the palm 4 (operation S65). Continuing, the process procedure carries out an imaging of the palm 4 in a condition in which the whole of the palm is illuminated with light (operation S66), and stores the image obtained by the imaging in the calibration surface storage section 72 as an image A (operation S67).

Subsequently, the process procedure extinguishes the palm illumination devices 302, 304, 306 and 308 (operation S68), images the palm 4 in a condition in which it is not illuminated with light (operation S69), and stores the image obtained by the imaging as an image C (operation S70).

The process procedure takes a difference between the image B and image C obtained in this way, and makes the difference an image D (operation S71). The process procedure calculates the central coordinates of a bright region in the image D (operation S72), calculates the ratio $r_F/r_C$ of the reflection coefficient of the palm 4 and calibration surface 66 (operation S73), and calculates a palm region S by taking the difference between the image A and image C (operation S74). Finally, the process procedure calculates the distance from the palm sensor 6 of each pixel of the palm region S (operation S75), and obtains distance map data. By so doing, the process procedure finishes the execution process.

With this kind of process, the kind of image 76 of the palm 4 shown in FIG. 19 is obtained in the imaging section 28. In the case of this image, as a portion surrounded by a border 78 is in a condition in which it droops toward the palm sensor 6, it appears bigger than the other fingers in the image 76. That is, from this kind of image, it is possible to know that the finger is in a drooping condition.

Figure 20:
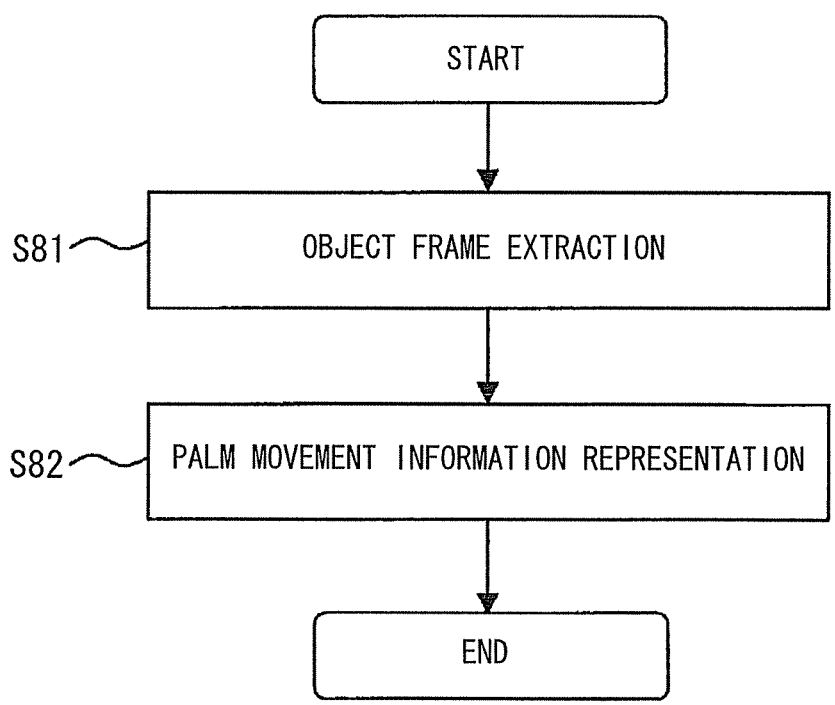
FIG. 20 is a flowchart depicting a palm movement extraction process procedure.

Next, FIGS. 20 and 21 will be referred to with regard to an extraction of a movement of the palm. FIG. 20 is a flowchart depicting a palm movement extraction process procedure. FIG. 21 is a flowchart depicting a palm movement information representation normalization process procedure. The processes shown in FIGS. 20 and 21 being examples, the invention is not limited to these processes.

The palm movement extraction process procedure is a process which acquires images representing the operation of the palm 4 shifting from the open state to the closed state. The process procedure, as shown in FIG. 20, carries out an extraction of an object frame (operation S81), and normalizes the palm 4 movement information representation (operation S82).

The object frame extraction process (operation S81) prompts the person being checked to open the palm 4, monitors the image obtained, and calculates the palm region distance for each frame of the image (FIG. 18). Then, at a point at which the diffusion of distance values within the palm region becomes equal to or less than a predetermined threshold value, and there ceases to be any fluctuation between consecutive frames, the extraction process determines that the palm 4 is in an opened condition (the open state). Even after it is determined that the palm 4 is opened, the monitoring of the image and the calculation of the palm region distance are continued.

After it is determined that the palm 4 is in the open state, the extraction process prompts the person being checked to close the palm 4. Then, in the way heretofore described, the extraction process calculates the diffusion of distance values within the palm region and, at a point at which there ceases to be any fluctuation between consecutive frames, determines that the movement of the palm 4 is in a stopped condition (the closed state). The extraction process takes a distance image obtained when the palm is in that condition to be a distance image of when the palm is closed.

It is possible to take the image frames from the time it is determined that the palm 4 is opened to the time it is determined that the palm 4 is closed to be the movement of the palm 4 from the time the palm 4 is opened to the time the palm 4 is closed recorded as distance values. In the process procedure, as shown in FIG. 21, the distance values are normalized (operation S91). For the sake of the normalization, a minimum value and maximum value of the distances within the palm region are calculated for all of the image frames. Then, the process procedure seeks a frame in which the difference between the minimum value and maximum value is largest, and normalizes all of the frames so that the difference becomes a predetermined K.

Next, the process procedure normalizes information of the height of the palm region (operation S92). In order to carry out this normalization process, the maximum value of the distances in the palm region is calculated. In order that the palm appears to have been placed at a predetermined height H, the process procedure converts the distance image of the palm 4 in such a way that the maximum value of the distances is equal to the height H. That is, in the event that the maximum value of the distances is the height h, the palm region is enlarged or reduced by a ratio of H/h. Then, the process procedure adds H-h to the pixel value.

Next, the process procedure normalizes information of the size of the palm region so that the area of the palm region in each frame attains a predetermined pixel number S (operation S93), normalizes the position of the palm region (operation S94), and normalizes the orientation of the palm region (operation S95). In the palm region orientation normalization process, the process procedure calculates a two-dimensional moment of the palm 4 and, based on the result of the calculation, two-dimensionally rotates the image so that the long axis of the palm region follows the vertical direction of the image.

Then, the process procedure temporally normalizes the palm 4 movement frames (operation S96). That is, the process procedure takes a time t of a frame when the palm 4 is opened to be t=0, and the time t of a frame when the palm 4 is closed to be t=1, and temporally normalizes frames between the palm 4 being in the open condition and its being in the closed condition (image frames of which the time t is between 0 and 1). The temporal normalization process records, for example, eleven frames in 0.1 increments of the time t from t=0 to t=1. In the event that there exists a time from the time t=0.1 to the time t=0.9 at which no frame exists, the normalization process interpolates for the frame at that time with the image of the frame at the time nearest to that time.

Distance Value Normalization (Operation S91)

Figure 22A:
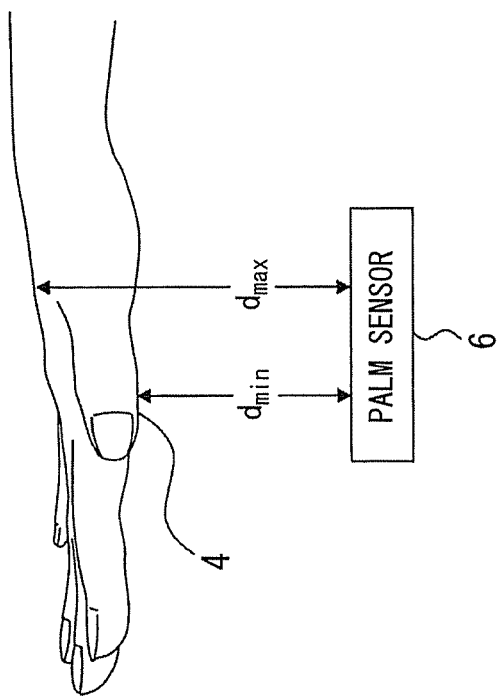
FIGS. 22A and 22B depict a condition in which a palm is open and a condition in which the palm is starting to be closed.
Figure 22B:
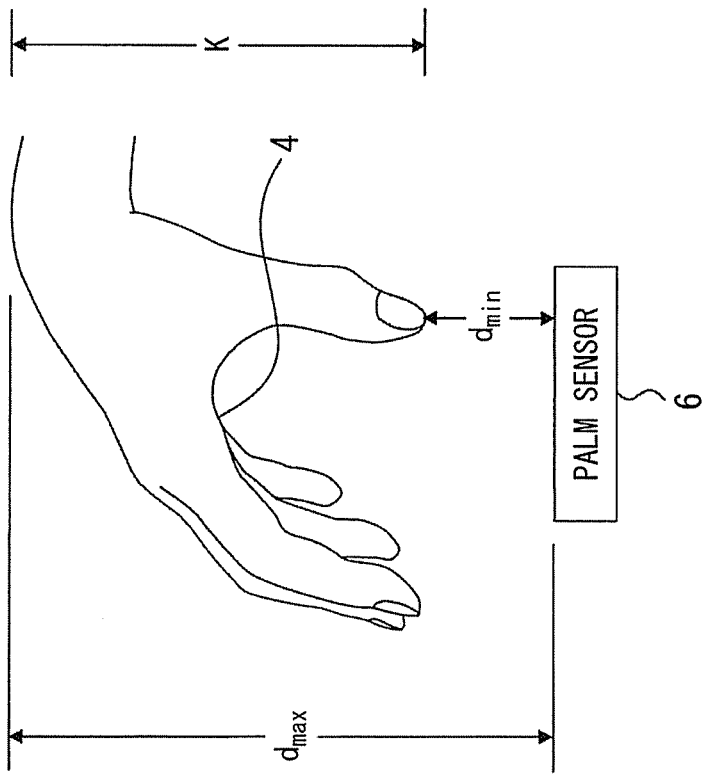
Figure 23:
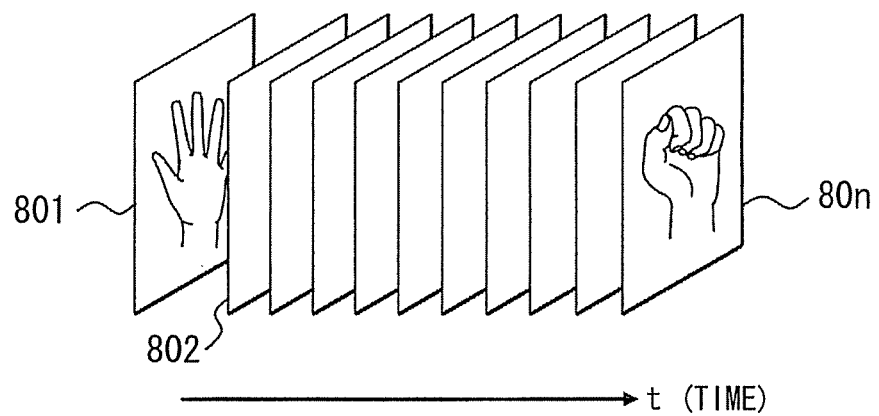
FIG. 23 depicts image frames.

FIGS. 22A, 22B and 23 will be referred to with regard to a distance value normalization. FIG. 22A depicts a condition in which a palm is opened. FIG. 22B depicts a condition in which a palm is starting to be closed. FIG. 23 depicts image frames. The configurations shown in FIGS. 22A, 22B and 23 being examples, the invention is not limited to these kinds of example.

The distance value normalization uses the image frames (FIG. 23) of the palm 4 from the condition in which the palm 4 is opened (FIG. 22A) to the condition in which it is closed. The normalization process calculates a minimum value $d_{min}$ and a maximum value $d_{max}$ within the palm region in each frame for all of the frames. As shown in FIG. 22B, in the condition in which the palm 4 is starting to be closed, the thumb droops, and the palm comes closest to the palm sensor 6. At this time, the distance between the palm region and the palm sensor 6 is the minimum value $d_{min}$. The normalization process seeks the frame in which the difference $(d_{max}-d_{min})$ between the minimum value $d_{min}$ and the maximum value $d_{max}$ is largest, and normalizes all of the frames so that the difference becomes the predetermined K (FIG. 22B). As shown in FIG. 23, when it is taken that an image frame of when the palm 4 is closed is an image frame 80n, the object image frames from an image frame 801 of when the palm 4 is open are configured of an n number of image frames. Putting the time t on the horizontal axis, the image frames shift through 801, 802 and so on to 80n, as shown in FIG. 23.

The normalization process calculates the maximum value $d_{max}$ and minimum value $d_{min}$ for each of these kinds of image frames 801 to 80n, and converts each image frame so that the difference in an image frame 80k, in which the difference ($d_{max}$–$d_{min}$) between the maximum value and minimum value is largest, is K.

Taking the number of the frame in which the difference ($d_{max}$–$d_{min}$) is largest to be $k_{max}$, a distance map $d'_k(i,j)$ after the normalization of a distance map $d_k(i,j)$ of a $k^{th}$ frame is obtained with the following formula (5).

Note that the $d_{max}$ and $d_{min}$ of the $k^{th}$ frame are $d_{max}(k)$ and $d_{min}(k)$ respectively.

Palm Region Height Normalization (Operation S92)

Figure 24:
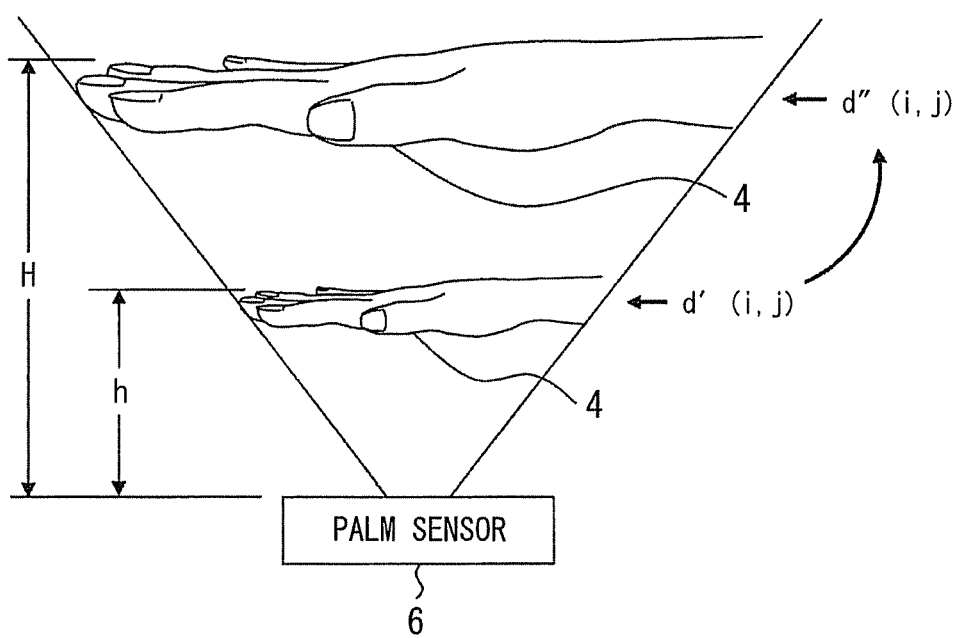
FIG. 24 is a diagram depicting a palm region height normalization.

This normalization process calculates the maximum value of the distances between the palm region and the palm sensor 6 and, in order that the palm 4 appears to have been placed at the predetermined height H, converts the distance image of the palm 4 in such a way that the maximum value of the distances is equal to the height H. That is, in the event that the maximum value of the distances is h, the palm region is enlarged or reduced by the ratio of H/h. Then, the normalization process adds H-h to the pixel value. A schematic diagram of when the palm 4 is in the opened condition is as in FIG. 24.

A distance map $d''(i,j)$ after the normalization of a distance map $d'(i,j)$ of each frame is obtained with the following formula (6).

$$d''(i, j) = d'\left(\frac{h}{H}i, \frac{h}{H}j\right) + (H - h) \quad (6)$$

Palm Region Size Normalization (Operation S93)

Next, information of the size of the palm region is normalized so that the area of the palm region in each frame attains the predetermined pixel number S. FIG. 25A illustrates a frame 81 with an area s before normalization. FIG. 25B illustrates a frame 82 with the area S after normalization. By means of this process, the frame 81 with the area s (FIG. 25A) is normalized to the frame 82 with the area S (FIG. 25B).

Taking the area of the palm region of each frame to be s, a distance map $d'''(i,j)$ after the normalization of the distance map $d''(i,j)$ of each frame is obtained with the following formula (7).

$$d'''(i, j) = d''\left(\sqrt{\frac{s}{S}}i, \sqrt{\frac{s}{S}}j\right) \quad (7)$$

Palm Region Position Normalization (Operation S94)

This normalization process, in each frame, shifts a center of gravity G of the palm region to the center of the image so that the position of the palm 4 comes into the middle of the image. The position normalization process takes the center of gravity coordinates of the palm region in each frame to be $(C_x, C_y)$, as shown in FIG. 26A, and shifts the center of gravity coordinates $(C_x, C_y)$ into the center of the image, as shown in FIG. 26B. Taking the central coordinates of the image to be (0,0), a distance map $d''''(i,j)$ after the normalization of the distance map $d'''(i,j)$ of each frame is obtained with the following formula (8). Each frame 83 is converted to a normalized frame 84, as shown in FIG. 26B.

$$d''''(i,j)=d'''(i+C_x, j+C_y) \quad (8)$$

Palm Region Orientation Normalization (Operation S95)

Figure 27B:
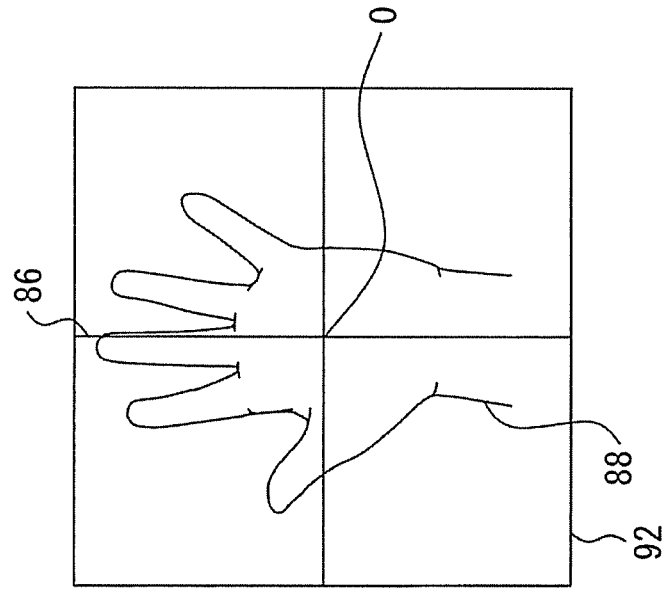
FIGS. 27A and 27B are diagrams depicting a palm region orientation normalization.
Figure 27A:
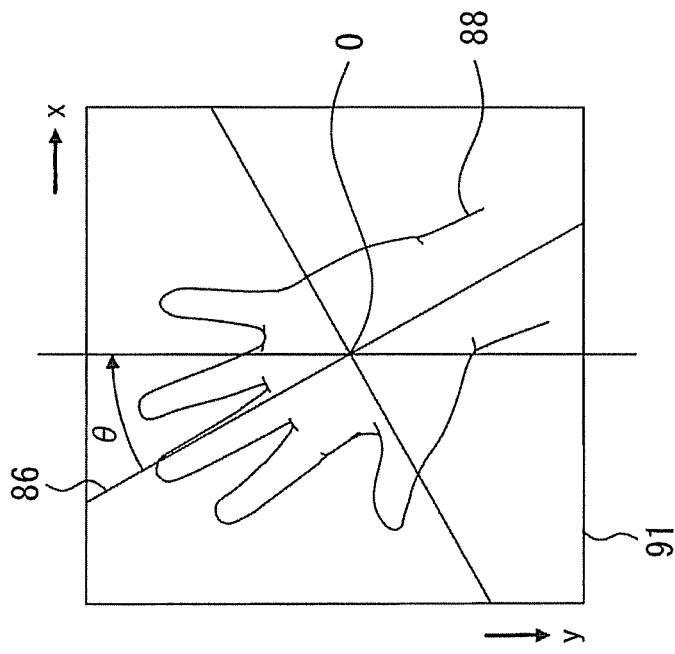

This normalization process calculates the two-dimensional moment of the palm 4 and, based on the result of the calculation, two-dimensionally rotates the image so that the long axis of the palm region follows the vertical direction of the image. A principal axis of inertia is used in the orientation normalization. A long axis 86 of the palm region (FIG. 27A) is, in other words, the principal axis of inertia. This normalization process sets coordinate axes (x axis, y axis) in an image 88, and takes the center O of the image 88 as the origin, as shown in FIG. 27A. In the event that the principal axis of inertia 86 is at an angle θ with respect to the y axis, a distance map $d'''''(i,j)$ after the normalization of the distance map $d''''(i,j)$ of each frame 91 is obtained with the following formulas (9) and (10). FIG. 27B illustrates a normalized frame 92.

$$\begin{pmatrix} i' \\ j' \end{pmatrix} = \begin{pmatrix} \cos\theta & -\sin\theta \\ \sin\theta & \cos\theta \end{pmatrix} \begin{pmatrix} i \\ j \end{pmatrix} \quad (9)$$

$$d'''''(i, j) = d''''(i, j) \quad (10)$$

A method of calculating this kind of principal axis of inertia 86 is disclosed in, for example, pages 91 to 94 of "Robot Vision" by Masahiko Yachida.

Palm Movement Frame Temporal Normalization (operation S96)

Figure 28:
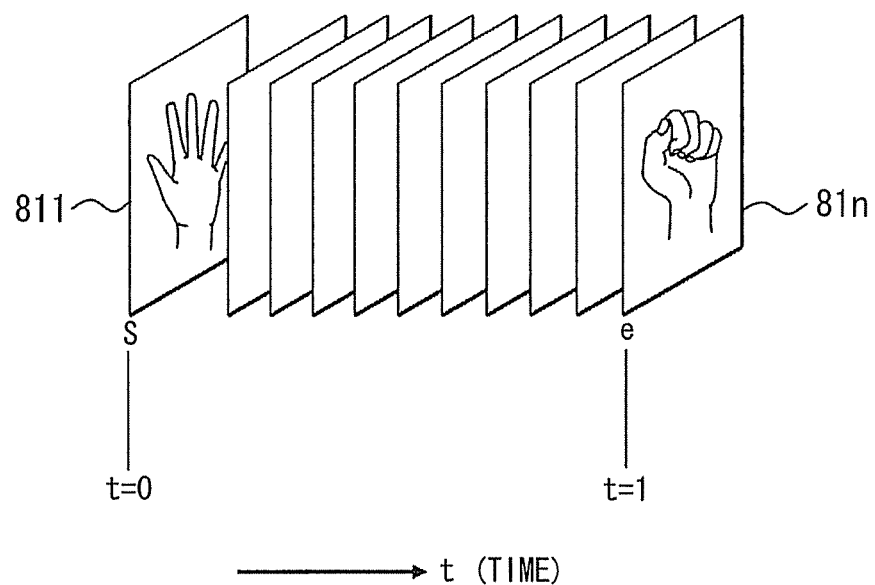
FIG. 28 is a diagram depicting a palm movement frame temporal normalization.

As shown in FIG. 28, a time of an image frame 811 when the palm 4 is opened is taken to be t=0, a time of an image frame 81n when the palm 4 is closed is taken to be t=1, and image frames between the palm being in the open condition and its being in the closed condition (image frames of which the time t is between 0 and 1) are temporally normalized. The normalization process records, for example, eleven frames in 0.1 increments of the time t from t=0 to t=1. In the event that there exists a time from the time t=0.1 to the time t=0.9 at which no frame exists, the normalization process obtains the frame for that time by interpolating with the image of the frame at the time nearest to that time.

Then, a distance map $d''''''_{k'}(i,j)$ of a $k'^{th}$ frame (0≤k'≤11, where k' is an integer) after the normalization is obtained from a distance map $d'''''_k(i,j)$ before the normalization with the following formulas. s and e indicate frames depicted in FIG. 28, where s≤k≤e, and k is an integer.

Regarding k in formula (11), in the event that k is an integer, formula (12) is established.

$$k = \frac{(10-k')s + k'e}{10} \quad (11)$$

$$d''''''_{k'}(i, j) = d'''''_{k'}(i, j) \quad (12)$$

Regarding k in formula (11), in the event that k is not an integer, [ ] is taken to be a Gauss symbol, and formula (13) is established.

$$d''''''_{k'}(i,j)=\{1-(k-[k])\}d'''''_{[k]}(i,j)+(k-[k])d'''''_{[k]+1}(i,j) \quad (13)$$

The palm movement common characteristic extraction process collects the previously mentioned palm movements from a plurality of people, and averages the distance maps of each frame in pixel units. As a result, the previously mentioned eleven frames obtained (FIG. 28) form the palm 4 movement common characteristics. The palm 4 movement common characteristics obtained are stored in the palm movement common characteristic storage section 18.

Figure 29A:
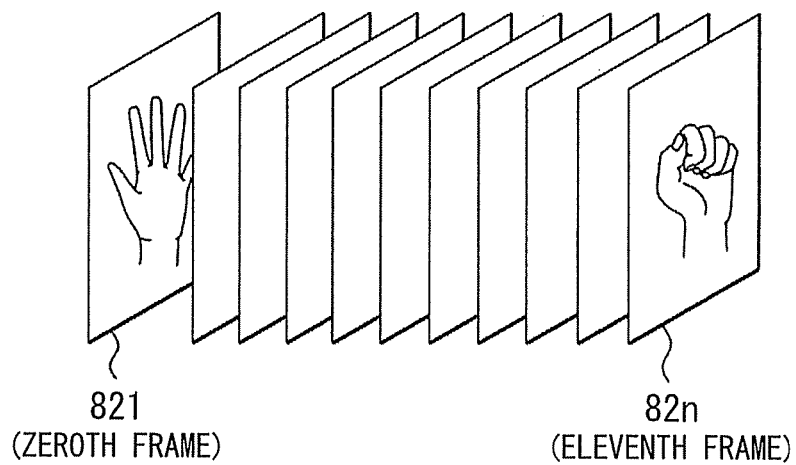
FIGS. 29A and 29B are diagrams depicting palm movement common characteristics and movement characteristics of a person being checked.
Figure 29B:
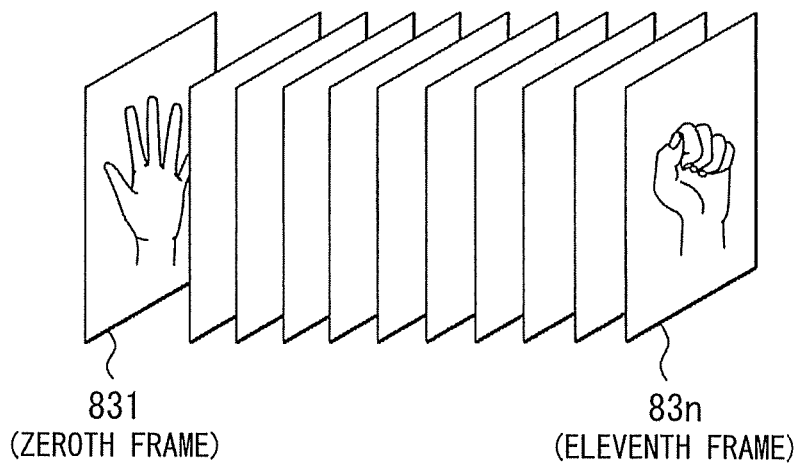

The palm movement characteristic matching process registers biological object information for, for example, a palm vein recognition, and checks the palm movement information in order to determine whether or not a palm (the object) held over the palm sensor for a matching is a biological object. The matching process acquires the palm movement characteristics of the person being checked by means of the heretofore mentioned process, and acquires the palm 4 movement common characteristics stored in the palm movement common characteristic storage section 18. As the characteristics are normalized for distance value, area, orientation, and time, the matching process, by comparing the corresponding images of the eleven frames (FIGS. 29A and 29B), can carry out a matching of the two. FIG. 29A is a diagram depicting the eleven frames which show the palm movement common characteristics. FIG. 29B is a diagram depicting the eleven frames which show the palm movement characteristics of the person being checked.

The comparison of the images calculates and accumulates the difference in distance values for each pixel in all eleven frames. Then, in the event that the accumulated value is equal to or less than a predetermined threshold value, the comparison process determines that the object of determination has carried out a movement similar to that of a biological object.

In the event of comparing a kth frame 84$k$ representing the common characteristics, as shown in FIG. 30A, and a kth frame 85$k$ representing the characteristics of the person being checked, as shown in FIG. 30B, the sum of the differences between corresponding coordinates of the frames 84$k$ and 85$k$ is calculated as the common characteristics $d_{mk}(i,j)$ of the frame 84$k$, and the characteristics $d_{nk}(i,j)$ of the person being checked of the frame 85$k$.

Taking the palm region of the common characteristic frame 84$k$ as $R_k$, an accumulated value M of the differences can be obtained with the following formula (14).

$$M = \sum_{k=0}^{11} \sum_{(i,j) \in R_k} |d_{mk}(i,j) - d_{nk}(i,j)| \qquad (14)$$

In the event that the accumulated value M is equal to or less than a predetermined threshold value Mth (M≤Mth), the matching process determines that the object of determination has carried out a movement similar to that of a biological object. Also, in the event of a match with the registered information, the matching process can confirm that the person being checked is a registered (authorized) person.

Some of the advantages of the disclosure including characteristic particulars of the heretofore described embodiment are, for example, as follows. However, although few advantages are listed herein, these are not the only benefits and advantages of the present invention.

1. Using palm movement information from a plurality of images acquired by an imaging of, for example, a palm as a biological object, can check the palm, and determine via the check whether or not the palm is a biological object. Moreover, an embodiment confirms whether or not a person being checked is a registered person by a comparison with registered movement information.

2. Using a palm as a determination region of a biological object, acquires movement information using an opening and closing of the palm as one example of bending and stretching of the biological object. According to an embodiment, the person being checked can undergo a determination of whether not he or she is a biological object with the simple operation of opening and closing the palm, and without being compelled to carry out any special operation.

3. The embodiment can realize a palm biometric determination method for a non-contact type of palm vein pattern recognition with a low cost sensor.

4. The embodiment, as it matches using a movement of a biological object common to humans, and carries out a matching by extracting three-dimensional information from a plurality of images, can increase determination accuracy.

5. The embodiment carries out a biometric determination based on images imaged (captured) while illuminating a palm with light, and checks an individual based on the determination.

6. A biometric authentication device in an embodiment, having an illumination part and an imaging part, issues an instruction to open and close a hand when carrying out a registration, a matching, or an identification for a biometric determination. As this carries out a check of a biological object based on an existence or otherwise of a movement thereof, it is possible to easily confirm whether or not it is a biological object.

7. The embodiment determines a movement of, for example, a palm as a biological object by collating a movement of a palm of a person being checked and palm movement information collected from a plurality of people, enabling a one to N authentication.

8. As an embodiment uses, in a measurement of a movement of, for example, a palm as a biological object, a light beam illumination position, and images having as values distances to each point on the palm calculated from a luminosity of a reflected light, it can provide a highly accurate determination. The luminosity of the reflected light, being the strength of reflected light entering the imaging section 28 from the palm 4, is the luminosity of each pixel of the images.

9. An embodiment uses, as images having as values distances which measure a movement of, for example, a palm as a biological object, a plurality of images imaged from a time of an instruction to open the palm to a time of an instruction to close the palm, and acquires movement information from the images.

10. An embodiment utilizes, as movement information of, for example, a palm as a biological object, information which has distance as a value, and in which a palm movement, a palm height, a palm size, a palm orientation, and a time when imaging, are each normalized.

11. An embodiment utilizes, as movement information of, for example, a palm as a biological object, information which has distance as a value, and in which numerals representing contours of an image normalized from a plurality of images with regard to the palm movement are normalized with regard to a time when imaging.

12. An embodiment, when determining whether or not a person being checked is a biological object, gives an instruction for an operation of clenching a palm, confirms whether or not the same kind of transformation is carried out for the object as for a human palm and, in the event that the same kind of transformation as for the palm does not occur, determines that the object is not a hand. As a three-dimensional measuring technique based on brightness using active illumination is used for a measurement of a shape of the object, the determination accuracy is increased.

13. An embodiment can determine that a fake object configured of an object having a reflective property equivalent to that of, for example, a palm as a biological object is not a hand.

Figure 32:
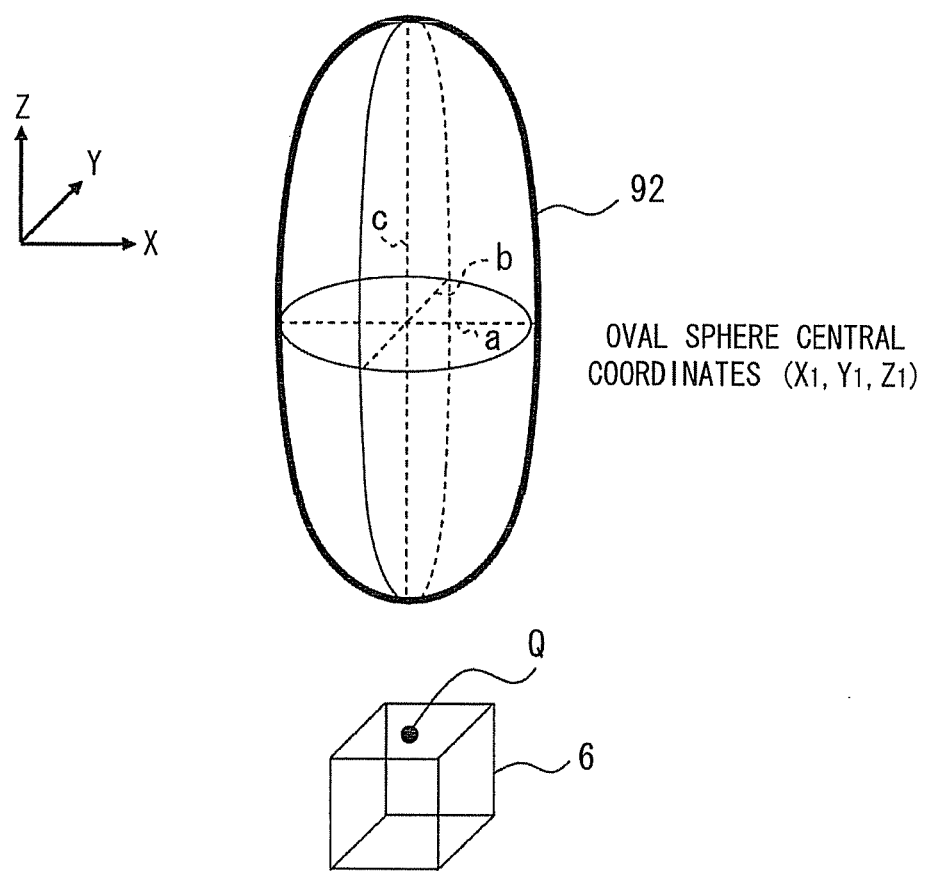
FIG. 32 is a diagram depicting an oval sphere which is fitted into a normalized palm image.

Next, FIGS. 31, 32, and 33A to 33E will be referred to with regard to another embodiment. FIG. 31 is a flowchart depicting a process procedure according to an embodiment. FIG. 32 is a diagram depicting an oval sphere which is fitted into a normalized palm image. FIGS. 33A to 33E are diagrams depicting a fitting in of an oval sphere in an opening and closing of a palm. The configurations shown in FIGS. 31, 32, and 33A to 33E being examples, the invention is not limited to these configurations.

Although a palm movement information representation differs from that of the above-described embodiment in a biometric authentication device, biometric authentication program, or biometric authentication method, this embodiment uses the same kind of device (FIG. 1) as the above-identified embodiment.

In the process procedure, as a distance value normalization (operation S101), a palm region height normalization (operation S102), and a palm region size normalization (operation S103) are the same as in the above-identified embodiment (FIG. 21), a description thereof will be omitted.

In an embodiment, after the normalization of the palm region size, simulates an oval sphere as one example of a geometry model, and fits the oval sphere into a palm image (operation S104). That is, an oval sphere 92 (FIGS. 32 and 33A to 33E) is fit into an image generated via operations S101 to S103, in which the distance value, palm region height, and palm region size are normalized. An embodiment, based on the fitting in of the oval sphere 92, normalizes the time of movement frames of coefficients of the oval sphere 92 (operation S105).

A coordinate system when fitting the oval sphere 92 into the palm region sets central coordinates $(X_1, Y_1, Z_1)$ in the oval sphere 92, and takes an origin Q of the imaging section 28 of the palm sensor 6 as a reference. In this case, a, b, and c are distances to portions farthest away from the central coordinates $(X_1, Y_1, Z_1)$ of the oval sphere 92 in an x axis direction, a y axis direction, and a z axis direction respectively.

In this coordinate system in which the top left of the image is set as the origin, the oval sphere 92 is expressed with the following equation (15). It is sufficient that the coefficients $X_1, Y_1, Z_1$, a, b, and c in the equation are obtained.

$$\frac{(X - X_1)^2}{a^2} + \frac{(Y - Y_1)^2}{b^2} + \frac{(Z - Z_1)^2}{c^2} = 1 \qquad (15)$$

These coefficients are obtained using an iterative approximation method based on a least squares method, Newton's method, the Levenberg-Marquardt method, or the like, with a pixel in the palm 4 region in a distance map as a sample point. As a result of fitting the oval sphere 92 into the palm region in each frame, the six coefficients $(X_1, Y_1, Z_1, a, b, \text{and } c)$ are obtained.

Figure 33A:
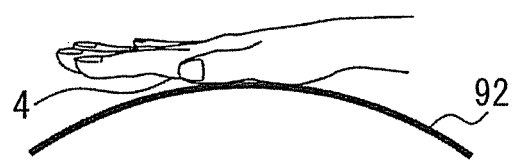
FIGS. 33A, 33B, 33C, 33D and 33E are diagrams depicting a fitting in of an oval sphere in an opening and closing of a palm.
Figure 33B:
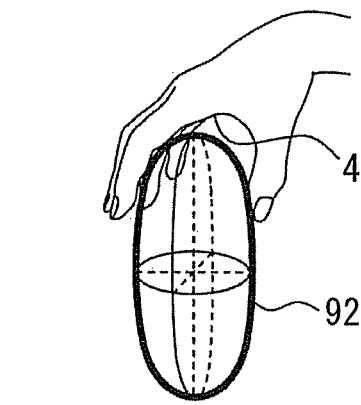
Figure 33C:
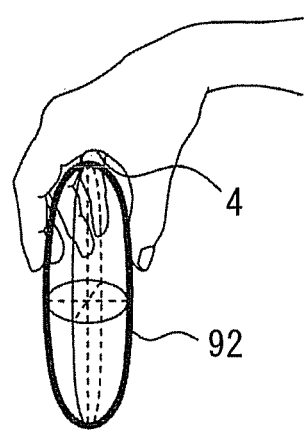
Figure 33D:
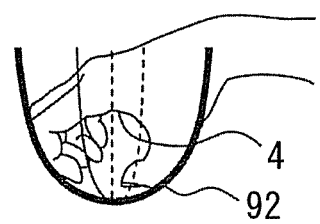
Figure 33E:
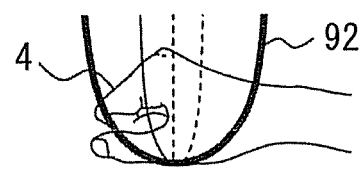

In the fitting of the oval sphere 92, which is one example of the previously mentioned geometry model, into the palm region, a condition in which the palm 4 is opened is a condition in which the hollow of the palm 4 is placed on the oval sphere 92, as shown in FIG. 33A. When the palm 4 is shifted from this condition to a condition in which it is closed, firstly, the oval sphere 92 is placed inside the palm 4, and the fingers assume a condition in which they surround the oval sphere 92, as shown in FIG. 33B. Subsequently, a condition is such that the fingers are moved from this condition in a direction which closes the palm 4, as shown in FIG. 33C. In this case, the oval sphere 92 fitted into the palm 4 becomes elongated. A condition immediately before the palm 4 is closed is a condition wherein the palm 4, which is in a curved condition, is enclosed in the interior of the oval sphere 92, as shown in FIG. 33D. Also, a condition wherein the palm 4 is completely closed, and a fist is formed, is a condition wherein a surface of the oval sphere 92 coincides with a lower surface side of the palm 4, as shown in FIG. 33E. In this way, the condition of the palm corresponds to an outline of the oval sphere 92, and the operation from the condition in which the palm 4 is opened to the condition in which it is closed shifts in the way shown in FIG. 33A, through FIGS. 33B to 33D, to FIG. 33E. This operational shift forms information for determining whether or not the palm is a biological object.

In the operational shift, an embodiment takes a time of a frame when the palm 4 is opened to be t=0, and the time of a frame when the palm 4 is closed to be t=1, and temporally normalizes frames between the palm being in the opened condition and its being in the closed condition (frames of which the time t is between 0 and 1). An embodiment records six coefficients corresponding to each of eleven frames obtained with the time t from t=0 to t=1 in 0.1 increments. In the event that there exists a time from the time t=0.1 to the time t=0.9 at which no frame exists, an embodiment interpolates with the coefficient of the oval sphere 92 of the frame at the time nearest to that time, and obtains a coefficient value for that time for each coefficient. Then, common characteristics of this kind of palm 4 movement are obtained by collecting the previously mentioned palm movements from a plurality of people, and calculating an average value of each coefficient of the oval sphere 92 in corresponding frames for each frame indicating the operational shift.

An embodiment, when collating the movement of a determination object and the movement common characteristics, firstly, calculates a difference for each frame, and for each coefficient of the oval sphere. Then, an embodiment, using a predetermined weight, calculates the sum of weightings of the differences for one frame and, depending on whether or not an accumulated value of the sums of all the frames is less than a predetermined threshold value, can determine whether or not the movement of the determination object is the same as the movement of a biological object.

Non-limiting characteristic particulars of an embodiment are, for example, as follows.

1. Palm movement information in an embodiment is information wherein, when fitting a geometry model into an image which has distance as a value, and in which a palm movement, a palm height, and a palm size are normalized, coefficients defining the geometry model are temporally normalized for a time when a shifting palm is imaged.

2. As an embodiment determines whether or not an object of determination is a biological object by means of a matching using a palm movement common model, it is possible to determine whether or not the object of determination is a biological object, even in the event that a palm movement at a time of registration and a palm movement at a time of determination differ slightly. Also, an embodiment, after confirming that the object of determination is a biological object, can confirm whether or not a person being checked is a specific individual.

Figure 34:
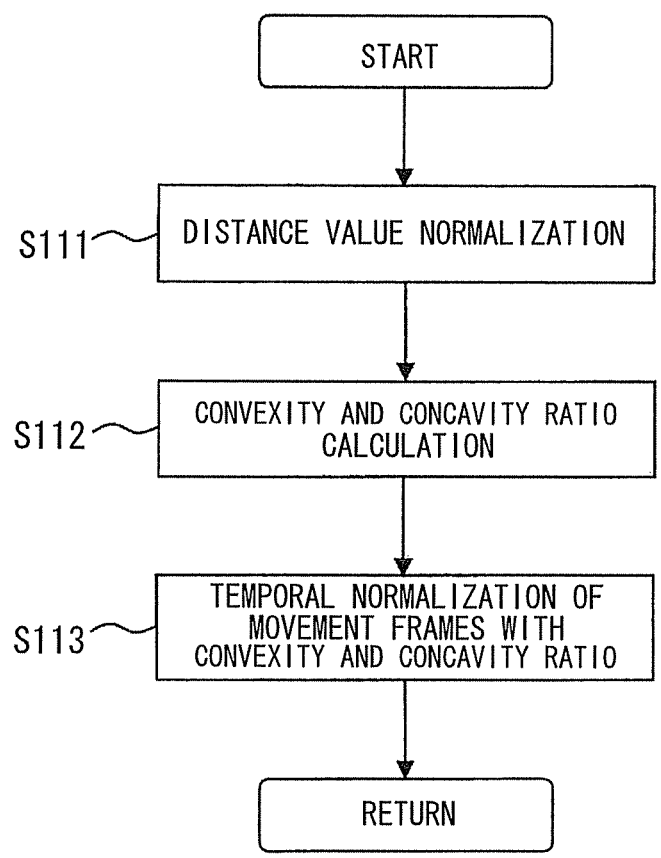
FIG. 34 is a flowchart depicting a process procedure according to an embodiment.
Figure 35A:
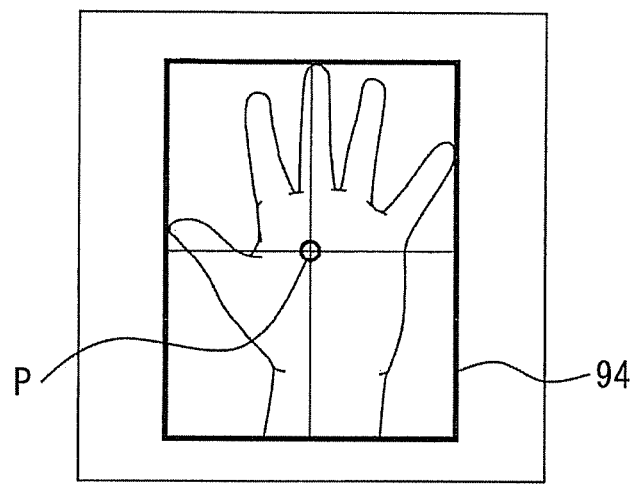
FIGS. 35A, 35B and 35C are diagrams for illustrating a calculation of shapes of surface of a palm.
Figure 35B:
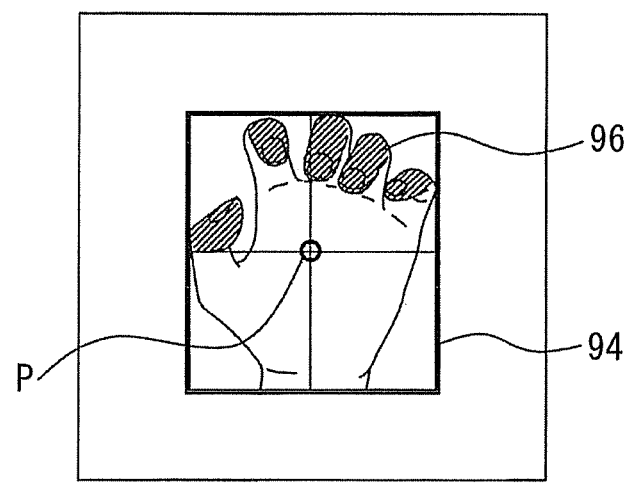
Figure 35C:
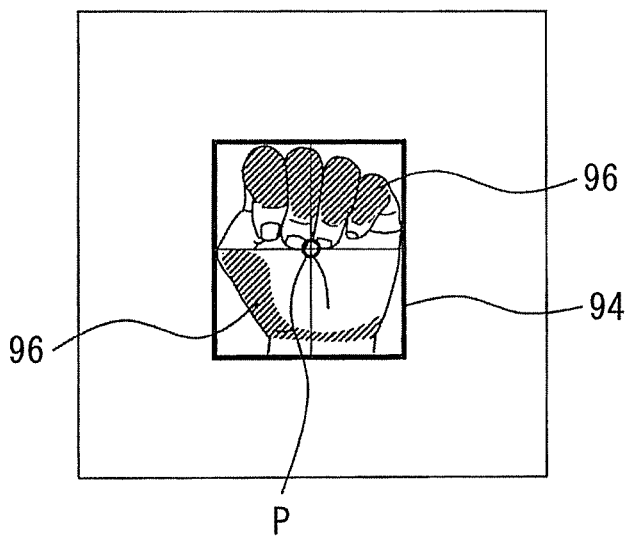

Next, FIGS. 34 and 35A to 35C will be referred to with regard to another embodiment. FIG. 34 is a flowchart depicting a process procedure according to this embodiment. FIGS. 35A to 35C are diagrams for illustrating a calculation of shapes of surface of a palm. The shapes of surface of the palm is represented by a ratio (hereinafter, "convexity and concavity ratio") according to convexity and concavity of surface of the palm. The configurations shown in FIGS. 34 and 35A to 35C being examples, the invention is not limited to these kinds of configuration.

An embodiment including a process which calculates a convexity and concavity ratio of the palm 4 in a palm movement information representation, it differs from the first described embodiment in this respect. As shown in FIG. 34, the process procedure of an embodiment, firstly, carries out a normalization of distance values in the same way as described in the above embodiment (FIG. 21) (operation S111). After the normalization, the process procedure calculates for a distance value image a convexity and concavity ratio indicating a ratio of pixels within a palm region which are of a distance deviating from a reference (operation S112), and temporally normalizes movement frames with this convexity and concavity ratio (operation S113). The reference in the convexity and concavity ratio calculation is the height of the center of the palm region.

The convexity and concavity ratio calculation (S112) is such that a circumscribed rectangle 94 is simulated in the palm region as one example of a geometry model, the circumscribed rectangle 94 (FIG. 35A) is fitted into the palm region, and a value h of the height of a pixel in a center P of the circumscribed rectangle 94 is calculated. Also, the calculation is such that a pixel number s within the palm region which is h±Δh is calculated in accordance with a predetermined Δh. That is, the pixel number s is the number of pixels in positions in the palm region which deviate by Δh from the center P of the circumscribed rectangle 94. The pixel number s being an area, taking the area of the whole of the palm region as S, and a ratio of the area s to the area S as r, the ratio r is expressed with an formula (16). The ratio r is calculated as the convexity and concavity ratio.

$$r = \frac{s}{S} \quad (16)$$

As shown in FIG. 35A, taking a palm region in a distance map $d_0(i,j)$ of a zeroth frame when the palm 4 is opened as $R_0$, the circumscribed rectangle 94 thereof is a border which touches an outline of the fingers farthest away from the center of the opened palm 4.

On the palm 4 beginning to be closed, the circumscribed rectangle 94 contracts in accordance with a change in the outline of the palm 4, as shown in FIG. 35B. A portion 96 indicated by shading in the diagram is a portion of pixels in positions in the palm region which deviate by Δh from the center P of the circumscribed rectangle 94. The palm 4 is closed and, in a final position in which it is in the closed state, the circumscribed rectangle 94 contracts further in accordance with a change in the outline of the palm 4, as shown in FIG. 35C. Also, the portion of pixels in positions in the palm region which deviate by Δh from the center P of the circumscribed rectangle 94 expands, and the portion of pixels in positions which deviate by Δh spreads to a portion in the vicinity of the wrist. The pixels in positions in the palm region which deviate by Δh from the height of the center of the circumscribed rectangle 94 diffusing as shown by the shading, when the palm 4 shifts from the opened condition to the closed condition, the operational shift can be known by the change in the convexity and concavity ratio.

Taking the coordinates of the center P of the circumscribed rectangle 94 as $(C_x, C_y)$, the height h of the coordinates is calculated as $d_0(C_x, C_y)$. Because of this, as the pixel number s within the palm region $R_0$ on the distance map $d_0(i,j)$ which has a value of h±Δh in accordance with the predetermined Δh is calculated, the ratio r of the pixel number s to the area S of the whole of the palm region $R_0$ (the number of pixels included in the palm region $R_0$) is calculated as previously mentioned.

Then, the temporal normalization of the movement frames with the convexity and concavity ratio (operation S113), as previously mentioned, takes the time of a frame when the palm 4 is opened to be t=0, and the time of a frame when the palm 4 is closed to be t=1, and temporally normalizes frames between the palm being in the open condition and its being in the closed condition (frames of which the time t is between 0 and 1). The normalization process records the convexity and concavity ratio of, for example, eleven frames in 0.1 increments of the time t from t=0 to t=1. In the event that there exists a time from the time t=0.1 to the time t=0.9 at which no frame exists, the normalization process obtains the convexity and concavity ratio for that time by interpolating with the image of the frame at the time nearest to that time.

An average of a plurality of people for obtaining movement common characteristics is calculated by averaging the convexity and concavity ratio for each frame. Also, when collating the movement of the object of determination and the movement common characteristics, it is sufficient that an embodiment calculates the difference in the convexity and concavity ratio for each frame and, depending on whether or not an accumulated value of the sums of all the frames is less than a predetermined threshold value, determines whether or not the movement of the determination object is the same as the movement of a biological object.

According to an embodiment, as the palm movement information, having distance as a value, uses a numeral representing a convexity and concavity in an image normalized with respect to palm movement from a plurality of images, it is possible to acquire highly accurate movement information. Also, an embodiment, using this kind of movement information, can increase a determination accuracy of a biometric determination.

Figure 36:
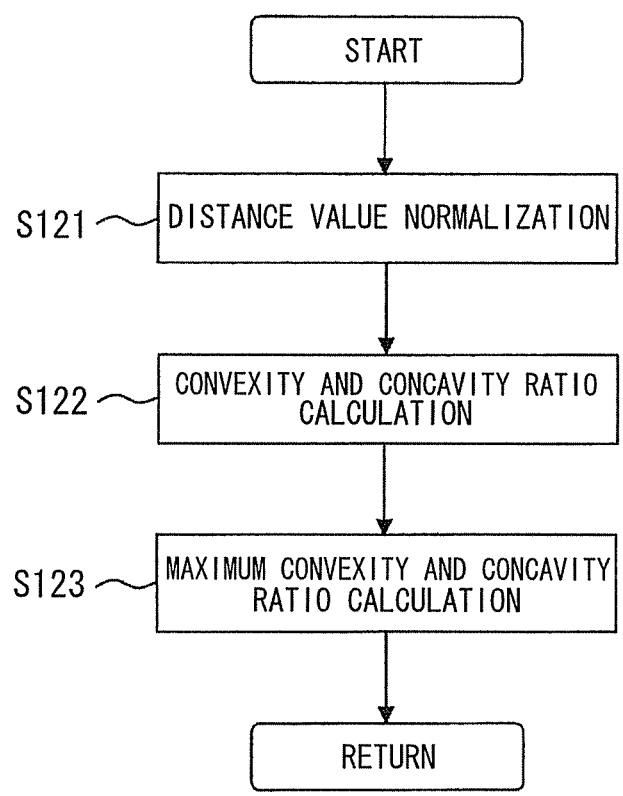
FIG. 36 is a flowchart depicting a process procedure according to an embodiment.

Next, FIG. 36 will be referred to with regard to another embodiment. FIG. 36 is a flowchart depicting a process procedure according to this embodiment. The configuration shown in FIG. 36 being an example, the invention is not limited to this configuration.

This embodiment is a simplification of the process procedure according to the above-described embodiment (FIG. 34).

The process procedure, as shown in FIG. 36, normalizes distance values (operation S121), calculates convexity and concavity ratios (operation S122), and calculates a maximum convexity and concavity ratio (operation S123). The processes of normalizing the distance values (operation 8121) and calculating the convexity and concavity ratios (operation S122) are the same as those of the above-described embodiment.

The calculation of the maximum convexity and concavity ratio (operation 8123) is such that a maximum value is obtained from among convexity and concavity ratios from a frame of a time when the palm 4 is opened to a frame of a time when the palm 4 is closed. The maximum convexity and concavity ratio is utilized as a movement characteristic. In order to obtain movement common characteristics, an average of information on a plurality of people is calculated based on an average of the maximum convexity and concavity ratios. The previously mentioned convexity and concavity ratio r of each frame from a zeroth frame to a tenth frame being calculated, the maximum convexity and concavity ratio is the maximum value of r amongst them.

When collating the movement of the object of determination and the movement common characteristics, an embodiment determines whether or not the difference between the maximum convexity and concavity ratios is less than a predetermined threshold value. That is, an embodiment confirms whether or not the determination object changes in the same way as the movement of a biological object.

Figure 37:
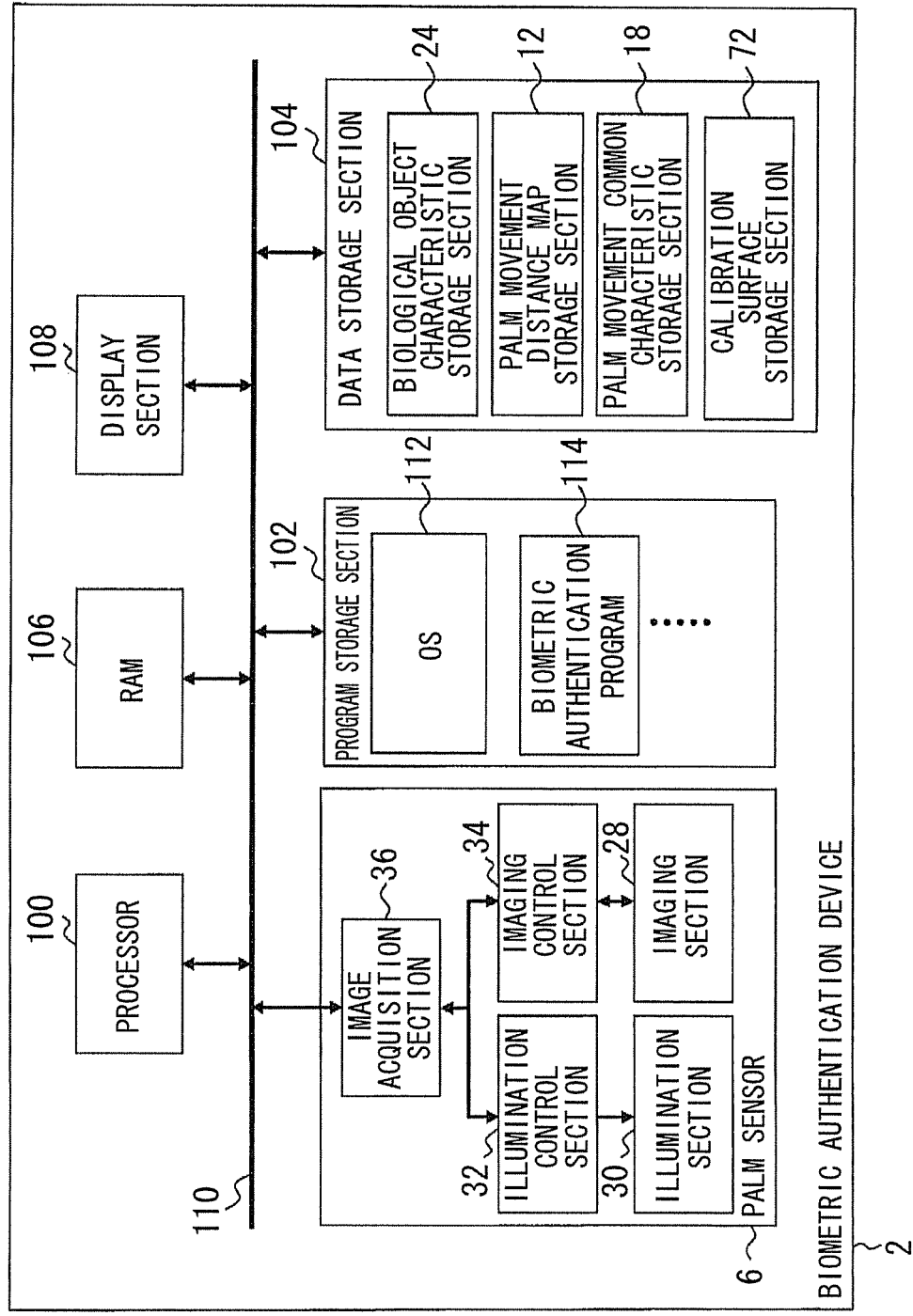
FIG. 37 depicts a hardware configuration of a biometric authentication device according to an embodiment.

FIG. 37 will be referred to with regard to another embodiment. FIG. 37 is a diagram depicting a hardware configuration of a biometric authentication device according to this embodiment. The configuration shown in FIG. 37 being an example, the invention is not limited to this configuration. In FIG. 37, portions identical to those in FIG. 1 are given identical reference numerals.

The biometric authentication device 2, as shown in FIG. 37, includes a processor 100, a program storage section 102, a data storage section 104, a random access memory (RAM) 106, a display section 108, and the palm sensor 6. These functional sections are mutually connected by a bus 110.

The processor 100, as well as executing an operating system (OS) 112 in the program storage section 102, executes various kinds of application program besides a biometric authentication program 114.

The program storage section 102, being a recording medium, stores various kinds of application, sub-routine, and the like, besides the previously mentioned OS 112 and biometric authentication program 114. The data storage section 104, being a recording medium, includes the previously mentioned palm movement distance map storage section 12, palm movement common characteristic storage section 18, biological object characteristic storage section 24, and calibration surface storage section 72. The RAM 106 is primarily a recording medium which forms a work area.

The display section 108, being one example of an information presentation section, is realized with a liquid crystal display (LCD) indicator, or the like. The display section 108 displays an instruction message during a process of a determination or the like, a determination result, and the like. The instruction message during the process is an instruction to a person being checked to open or close the palm 4. It being acceptable that the instruction message is output by voice, it is acceptable that the display section 108 includes a voice emission section which emits a voice message.

The palm sensor 6, as previously mentioned, includes the imaging section 28, illumination section 30, illumination control section 32, imaging control section 34, and image acquisition section 36. These functional sections are controlled by the processor 100.

According to this kind of configuration, the palm region extraction section 8, palm region distance calculation section 10, palm movement characteristic extraction section 14, palm movement common characteristic extraction section 16, palm movement characteristic matching section 20, biological object characteristic data generation section 22, and biological object characteristic data matching section 26 are realized with the processor 100 and RAM 106, based on an execution of the OS 112 and biometric authentication program 114.

The heretofore described embodiments illustrate an opening and closing of a palm as one example of bending and stretching of a biological object, but it is also acceptable that, besides the palm, the biological object is a biometric region such as a hand, an arm, a foot, etc. In this case, the palm sensor 6 becoming a biological object sensor, the palm region extraction section 8 a biological object region extraction section, the palm region distance calculation section 10 a biological object region distance calculation section, the palm movement distance map storage section 12 a biological object movement distance map storage section, the palm movement characteristic extraction section 14 a biological object movement characteristic extraction section, the palm movement common characteristic extraction section 16 a biological object movement common characteristic extraction section, the palm movement common characteristic storage section 18 a biological object movement common characteristic storage section, and the palm movement characteristic matching section 20 a biological object movement characteristic matching section, another embodiment is configured of those and the biological object characteristic data generation section 22, biological object characteristic storage section 24, and biological object characteristic data matching section 26.

As opposed to the opening and closing of the palm in the heretofore described embodiments, it is acceptable that another embodiment is configured in such a way as to image bending and stretching of a hand, bending and stretching of a palm, or bending and stretching of a finger and, using a plurality of images representing the bending and stretching of the hand, palm, or finger in the same way as the heretofore described embodiments, determine whether or not the object of determination is a biological object. In the event that a movement of a hand as a biological object is taken as an object of determination, the other embodiment can determine whether or not the object of determination is a biological object easily and with a high accuracy, as a result of which it is possible to increase the accuracy of a biometric authentication.

Although the heretofore described embodiments image an operation of a palm shifting from an open state to a closed state, it is acceptable that another embodiment is configured in such a way as to take the closed state of the palm 4 as an operation starting point, and image an operation of shifting from the closed state to the open state.

The heretofore described embodiments, simulating a geometry model in order to identify a movement of a palm, indicate the oval sphere 92 (FIG. 32) and the circumscribed rectangle 94 (FIG. 35) as examples of the model. It is acceptable that another embodiment fits a different polyhedron or spherical object into the movement of the palm, and calculates the previously mentioned coefficients in order to identify a convexity and concavity, or a distance from a reference position.

The heretofore described embodiments indicate palm images as one example of a vein recognition, but the invention can also be applied to a biometric determination, other than the vein recognition, which uses palm movement information.

The heretofore described embodiments exemplify with the palm sensor 6 as a processing section which acquires a palm image, but it is acceptable that the invention uses a different detection section which acquires determination information as a sensor which acquires an image other than one of a palm.

The heretofore described embodiments carry out a normalization process from a plurality of aspects for a plurality of images, but it is also acceptable to carry out a normalization process from any one aspect, or a selected plurality of aspects, rather than from all of them.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW. An example of communication media includes a carrier-wave signal.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A biometric authentication device, comprising:
a memory configured to store a program; and
a processor coupled to the memory and configured to:
extract movement information representing bending and stretching of an imaging object from a plurality of images obtained from an imaging section, and
determine whether the imaging object is of a biological object by comparing the movement information extracted with previously generated data characteristic of a biological object, and
measure a movement of the imaging object using images having distance information representing distances of surface of the imaging object calculated from a position of and strengths of reflected light from the imaging object illuminated by an illuminating section,
wherein biometric information of the imaging object is authenticated when the determining indicates that the imaging object is a biological object,
wherein the images having the distance information are a plurality of images having distance information of the imaging object imaged from an open state to a closed state, or from the closed state to the open state, and
wherein the movement information is information where a geometry model is fitted into an image, the distance information and plurality of images are normalized with respect to the movement of the imaging object, information of a height of the imaging object, or information of a size of the imaging object, and coefficients defining the geometry model are normalized with respect to a time of imaging the imaging object.

2. A biometric authentication device, comprising:
a memory configured to store a program; and
a processor coupled to the memory and configured to:
extract movement information representing bending and stretching of an imaging object from a plurality of images obtained from an imaging section, and
determine whether the imaging object is of a biological object by comparing the movement information extracted with previously generated data characteristic of a biological object, and
measure a movement of the imaging object using images having distance information representing distances of surface of the imaging object calculated from a position of and strengths of reflected light from the imaging object illuminated by an illuminating section,
wherein biometric information of the imaging object is authenticated when the determining indicates that the imaging object is a biological object,
wherein the images having the distance information are a plurality of images having distance information of the imaging object imaged from an open state to a closed state, or from the closed state to the open state, and
wherein the movement information is information having a numeral representing a shape of surface of the imaging object, where the distance information and plurality of images are normalized with respect to the movement of the imaging object that is normalized with respect to a time of imaging the imaging object.

3. A biometric authentication device, comprising:
a memory configured to store a program; and
a processor coupled to the memory and configured to:
extract movement information representing bending and stretching of an imaging object from a plurality of images obtained from an imaging section, and
determine whether the imaging object is of a biological object by comparing the movement information extracted with previously generated data characteristic of a biological object, and
measure a movement of the imaging object using images having distance information representing distances of surface of the imaging object calculated from a position of and strengths of reflected light from the imaging object illuminated by an illuminating section,
wherein biometric information of the imaging object is authenticated when the determining indicates that the imaging object is a biological object,
wherein the images having the distance information are a plurality of images having distance information of the imaging object imaged from an open state to a closed state, or from the closed state to the open state, and
wherein the movement information is a maximum value of numerals representing shapes of surface of the imaging object normalized with respect to the movement of the imaging object, among the distance information and plurality of images.

4. The biometric authentication device according to claim 3, wherein the processor is configured to:
match the movement information representing the bending and stretching of the imaging object and movement information collected from a plurality of people, and
determine whether the imaging object is a biological object.

5. The biometric authentication device according to claim 3, wherein the processor is configured to:
measure a movement of the imaging object using images having distance information representing distances of surface of the imaging object calculated from a position of and strengths of reflected light from the imaging object illuminated by an illuminating section.

6. The biometric authentication device according to claim 5, wherein
the images having the distance information are a plurality of images having distance information of the imaging object imaged from an open state to a closed state, or from the closed state to the open state.

7. The biometric authentication device according to claim 5, wherein
the movement information includes the distance information, is normalized with respect to one or all of movement, information of height, size, orientation of the imaging object, and a time of imaging the imaging object.

8. A biometric authentication method, comprising:
imaging an imaging object; and
extracting movement information representing bending and stretching of the imaging object from a plurality of images obtained from the imaging, and
determining whether the imaging object is of a biological object by comparing the movement information extracted with previously generated data characteristic of a biological object, and
acquiring movement information of the imaging object includes using images having distance information representing distances of surface of the imaging object calculated from a position of an illuminating section and strengths of reflected light of the imaging object,
wherein biometric information of the imaging object is authenticated when the determining indicates that the imaging objet is a biological object,
wherein the images having the distance information are a plurality of images having distance information of the imaging object imaged from an open state to a closed state, or from the closed state to the open state, and
wherein the movement information used in the determination is information where a geometry model is fitted into an image, the distance information and plurality of images are normalized with respect to the movement of the imaging object, information of the height of the imaging object, or information of the size of the imaging object, and coefficients defining the geometry model are normalized with respect to a time of imaging the imaging object.

9. The biometric authentication method according to claim 8, wherein
the determining matches the movement information representing the bending and stretching of the imaging object and movement information collected from a plurality of people, and determines whether the imaging object is a biological object.

10. The biometric authentication method according to claim 8, comprising:
acquiring movement information of the imaging object includes using images having distance information representing distances of surface of the imaging object calculated from a position of an illuminating section and strengths of reflected light of the imaging object.

11. The biometric authentication method according to claim 10, wherein
the images having the distance information are a plurality of images having distance information of the imaging object imaged from an open state to a closed state, or from the closed state to the open state.

12. The biometric authentication method according to claim 10, wherein
the movement information used in the determination is information having the distance information, is normalized with respect to one or all of a movement, information of height, size, orientation of the imaging object, and a time of imaging the imaging object.

13. The biometric authentication method according to claim 8, wherein the determining indicates a comparison match of the movement information extracted with a predetermined value that indicates a movement of a biological object.

14. A biometric authentication method, comprising:
imaging an imaging object; and
extracting movement information representing bending and stretching of the imaging object from a plurality of images obtained from the imaging, and
determining whether the imaging object is of a biological object by comparing the movement information extracted with previously generated data characteristic of a biological object, and
acquiring movement information of the imaging object includes using images having distance information representing distances of surface of the imaging object calculated from a position of an illuminating section and strengths of reflected light of the imaging object,
wherein biometric information of the imaging object is authenticated when the determining indicates that the imaging objet is a biological object,
wherein the images having the distance information are a plurality of images having distance information of the imaging object imaged from an open state to a closed state, or from the closed state to the open state,
wherein the movement information used in the determination is information where a numeral representing a shape of surface of the imaging object of an image wherein the distance information and plurality of images are normalized with respect to the movement of the imaging object is normalized with respect to a time of imaging the imaging object.

15. A biometric authentication method, comprising:
imaging an imaging object; and
extracting movement information representing bending and stretching of the imaging object from a plurality of images obtained from the imaging, and
determining whether the imaging object is of a biological object by comparing the movement information extracted with previously generated data characteristic of a biological object, and
acquiring movement information of the imaging object includes using images having distance information representing distances of surface of the imaging object calculated from a position of an illuminating section and strengths of reflected light of the imaging object,
wherein biometric information of the imaging object is authenticated when the determining indicates that the imaging objet is a biological object,
wherein the images having the distance information are a plurality of images having distance information of the imaging object imaged from an open state to a closed state, or from the closed state to the open state,
wherein the movement information used in the determination is a maximum value of numerals representing shapes of surface of the imaging object normalized with respect to the movement of the imaging object, among the distance information and the plurality of images.

* * * * *

UNITED STATES PATENT AND TRADEMARK OFFICE
CERTIFICATE OF CORRECTION

PATENT NO.        : 8,787,622 B2                                    Page 1 of 1
APPLICATION NO.   : 12/618102
DATED             : July 22, 2014
INVENTOR(S)       : Masaki Watanabe It is certified that error appears in the above-identified patent and that said Letters Patent is hereby corrected as shown below:

In the Claims

Column 25, Line 33, Claim 8, Delete "objet" and insert -- object --, therefor.

Column 26, Line 29, Claim 14, Delete "objet" and insert -- object --, therefor.

Column 26, Line 57, Claim 15, Delete "objet" and insert -- object --, therefor.

Signed and Sealed this
Fourth Day of November, 2014

Michelle K. Lee
*Deputy Director of the United States Patent and Trademark Office*